United States Patent
Huizing et al.

(10) Patent No.: US 10,569,230 B2
(45) Date of Patent: Feb. 25, 2020

(54) SUPPORTED WATER VAPOR TRANSPORT MEMBRANE COMPRISING POLYETHYLENE OXIDE COPOLYMER

(71) Applicant: CORE Energy Recovery Solutions Inc., Vancouver (CA)

(72) Inventors: Ryan Nicholas Huizing, Vancouver (CA); Hao Chen, Coquitlam (CA); Frankie Kin Bong Wong, Vancouver (CA)

(73) Assignee: CORE Energy Recovery Solutions Inc., Vancouver (CA)

( * ) Notice: Subject to any disclaimer, the term of this patent is extended or adjusted under 35 U.S.C. 154(b) by 160 days.

(21) Appl. No.: 15/577,926

(22) PCT Filed: May 30, 2016

(86) PCT No.: PCT/CA2016/050610
§ 371 (c)(1),
(2) Date: Nov. 29, 2017

(87) PCT Pub. No.: WO2016/191868
PCT Pub. Date: Dec. 8, 2016

(65) Prior Publication Data
US 2018/0161735 A1 Jun. 14, 2018

Related U.S. Application Data

(60) Provisional application No. 62/168,724, filed on May 30, 2015.

(51) Int. Cl.
*B01D 69/12* (2006.01)
*B01D 53/22* (2006.01)
(Continued)

(52) U.S. Cl.
CPC ......... *B01D 69/125* (2013.01); *B01D 53/228* (2013.01); *B01D 69/02* (2013.01);
(Continued)

(58) Field of Classification Search
CPC .............. B01D 53/228; B01D 67/0081; B01D 67/0088; B01D 67/0093; B01D 67/0095;
(Continued)

(56) References Cited

U.S. PATENT DOCUMENTS 4,857,201 A * 8/1989 Black ................. B01D 67/0088
210/655
5,258,481 A 11/1993 Hesselmans et al.
(Continued)

FOREIGN PATENT DOCUMENTS

| CN | 101695869 B | 5/2012 |
|----|-------------|--------|
| CN | 101781417 B | 5/2012 |

(Continued)

OTHER PUBLICATIONS

Lubnin, A. V., "Novel, 'Breathable' Polyurethane Dispersions," Paint & Coatings Industry Magazine, 2005.
(Continued)

*Primary Examiner* — Jason M Greene
(74) *Attorney, Agent, or Firm* — Oyen Wiggs Green & Mutala LLP

(57) ABSTRACT

An air-impermeable water vapor transport membrane comprises an active layer on a microporous polymeric substrate. The active layer comprises a polyethylene-oxide containing copolymer and a polar protic solvent in an amount of about 3% to about 100% of copolymer weight in the active layer. Molecules of the protic solvent are bonded to the copolymer. The polar protic solvent reduces temperature-dependent variability in the water-vapor permeability of the membrane.

15 Claims, 11 Drawing Sheets

(51) Int. Cl.
  *B01D 69/02* (2006.01)
  *B01D 71/26* (2006.01)
  *B01D 71/54* (2006.01)
  *F24F 3/14* (2006.01)
  *H01M 2/16* (2006.01)

(52) U.S. Cl.
  CPC .............. *B01D 71/26* (2013.01); *B01D 71/54* (2013.01); *F24F 3/14* (2013.01); *H01M 2/1653* (2013.01); *B01D 2325/20* (2013.01)

(58) Field of Classification Search
  CPC ...... B01D 69/125; B01D 71/26; B01D 71/52; B01D 71/76; B01D 71/80; B01D 2257/80; F24F 3/14; H01M 2/145; H01M 2/1563; H01M 2/1686; F28D 19/00
  See application file for complete search history.

(56) References Cited

U.S. PATENT DOCUMENTS

| | | | |
|---|---|---|---|
| 5,294,346 | A | 3/1994 | Donato et al. |
| 5,911,880 | A * | 6/1999 | Klein ................ B01D 67/0011 210/493.1 |
| 6,080,507 | A | 6/2000 | Yu |
| 6,287,730 | B1 | 9/2001 | Callahan et al. |
| 6,897,281 | B2 | 5/2005 | Lubnin et al. |
| 7,439,316 | B2 | 10/2008 | Hesselmans et al. |
| 8,795,565 | B2 | 8/2014 | Wei et al. |
| 9,045,582 | B2 | 6/2015 | Liu et al. |
| 2009/0197064 | A1 | 8/2009 | Benattar |
| 2010/0133172 | A1 | 6/2010 | Song et al. |
| 2011/0120304 | A1 | 5/2011 | Peinemann et al. |
| 2011/0223486 | A1 | 9/2011 | Zhang et al. |
| 2012/0061045 | A1 * | 3/2012 | Huizing ................ B01D 53/268 165/10 |
| 2014/0255792 | A1 | 9/2014 | Cao et al. |
| 2015/0168391 | A1 * | 6/2015 | Ying .................. B01D 67/0088 506/13 |
| 2016/0250600 | A1 * | 9/2016 | Peinemann ............ B01D 71/52 210/500.23 |
| 2018/0111158 | A1 * | 4/2018 | Tanikawa ............... H01M 2/145 |

FOREIGN PATENT DOCUMENTS

| | | |
|---|---|---|
| CN | 101704308 B | 4/2013 |
| CN | 101786332 B | 7/2013 |
| EP | 0560901 B1 | 5/1997 |
| EP | 0981172 B1 | 9/2004 |
| WO | 2008150867 A2 | 12/2008 |

OTHER PUBLICATIONS

Gibson, P. et al., "An Automated Water Vapor Diffusion Test Method for Fabrics, Laminates, and Films", Journal of Industrial Textiles, vol. 24, No. 4, pp. 332-345, Apr. 1995.
Coogan, R. G., "Post-crosslinking of water-borne urethanes," Progress in Organic Coatings, vol. 32, pp. 51-63, 1997.
Hesselmans, L. C. J. et al., "Polycarbodiimide crosslinkers," Progress in Organic Coatings, vol. 55, No. 2, pp. 142-148, 2006.
Posthumus, W. et al., "Crosslinking by polycarbodiimides," Progress in Organic Coatings, vol. 58, No. 2-3, pp. 231-236, 2007.
Abraham, K. M. et al., "Polymer Electrolytes Reinforced by Celgard® Membranes," J. Electrochem. Soc., vol. 142, No. 3, pp. 683-687, 1995.
Arora, P. et al., "Battery Separators," Chem. Rev., vol. 104, No. 10, pp. 4419-4462, 2004.
Meng, Q. et al., "A poly(ethylene glycol)-based smart phase change material," Solar Energy Materials and Solar Cells, vol. 92, No. 10, pp. 1260-1268, 2008.
Zhou, H. et al., "Water vapor permeability of the polyurethane/TiO2 nanohybrid membrane with temperature sensitivity," J. Appl. Polym. Sci., vol. 109, No. 5, pp. 3002-3007, 2008.
Korley, L. T. J. et al., "Effect of the degree of soft and hard segment ordering on the morphology and mechanical behavior of semicrystalline segmented polyurethanes," Polymer, vol. 47, No. 9, pp. 3073-3082, 2006.
Li, B. et al., "The physical properties of nonionic waterborne polyurethane with a polyether as side chain," J. Appl. Polym. Sci., vol. 127, No. 3, pp. 1848-1852, 2013.
Liu, F. et al., "Preparation and properties of water-borne polyurethane with branched straight aliphatic chains," J. Appl. Polym. Sci., vol. 121, No. 3, pp. 1536-1542, 2011.
Tsai, H.-C. et al., "Preparation and physical properties of nonionic aqueous polyurethane coatings containing different side chain PEGME length," J. Appl. Polym. Sci., vol. 108, No. 4, pp. 226-2273, 2008.
Yen, M.-S. et al., "Effect of soft segment composition on the physical properties of nonionic aqueous polyurethane containing side chain PEGME," J. Appl. Polym. Sci., vol. 105, No. 3, pp. 1391-1399, 2007.
Frick, A. et al., "Characterization of TPU-elastomers by thermal analysis (DSC)," Polymer Testing, vol. 23, No. 4, pp. 413-417, 2004.
Zhou, H. et al., "Thermal Sensitive Polyurethane Membranes with Desirable Switch Temperatures", Macromolecular Research, vol. 18, No. 11, pp. 1053-1059, 2010.

\* cited by examiner

SUPPORTED WATER VAPOR TRANSPORT MEMBRANE COMPRISING POLYETHYLENE OXIDE COPOLYMER

CROSS-REFERENCE TO RELATED APPLICATION

This application claims convention priority from U.S. patent application No. 62/168,724 entitled CONTROLLABLE PERMEABILITY MEMBRANES and filed on May 30, 2015 which is hereby incorporated herein by reference for all purposes. For purposes of the United States of America, this application claims the benefit of U.S. patent application No. 62/168,724 filed on May 30, 2015 which is hereby incorporated herein by reference for all purposes.

FIELD

This application relates to membranes that are selectively permeable. A particular application for membranes according to some embodiments is for water vapor transport. Membranes that selectively pass water vapor have application, for example, in energy recovery ventilation ('ERV') systems.

BACKGROUND

In buildings it is generally desirable to provide an exchange of air such that air from inside the building is expelled and replaced with fresh air from outside the building. In colder climates where the inside of the building is much warmer than the outside air ('heating applications') or in hot climates where the inside of the building is air-conditioned and is much cooler than the outside air ('cooling applications') there is an energy cost to this. In heating applications the fresh air is typically both colder and drier than the air inside the building. Energy is required to heat and humidify the fresh air. The amount of energy required can be reduced by transferring heat and moisture from the outgoing air to incoming air. In cooling applications the fresh air is typically both warmer and more moist than the air inside the building. Energy is required to cool and dehumidify the fresh air. The amount of energy required for heating and cooling applications can be reduced by transferring heat and moisture between the outgoing air and the incoming air. This may be done using an ERV system comprising membranes which separate flows of incoming and outgoing air. The characteristics of the membranes are an important factor in the performance of an ERV system.

Ideally a membrane in an ERV system should be: air-impermeable such that the membrane can maintain effective separation of the incoming and outgoing air flows; have a high thermal conductance for effective heat transfer between the incoming and outgoing air flows; and provide high water vapor transport for effective transfer of moisture between the incoming and outgoing air flows. Achieving these characteristics typically favors the use of thin membranes.

In addition to the above it is desirable that the membranes be robust enough for commercial use, cost effective to produce, and compliant with any applicable regulations. At least some jurisdictions have regulations that relate to the flammability of membranes used in ERV systems. For example, UL 94 is a standard released by Underwriters Laboratories of the USA which relates to flammability of plastic materials for parts in devices and appliances. UL 94 classifies plastics according to how they burn in various orientations and thicknesses. From lowest (least flame-retardant) to highest (most flame-retardant), the classifications are: HB: slow burning on a horizontal specimen; burning rate <76 mm/min for thickness <3 mm and burning stops before 100 mm; V-2: burning stops within 30 seconds on a vertical specimen; drips of flaming particles are allowed; V-1: burning stops within 30 seconds on a vertical specimen; drips of particles allowed as long as they are not inflamed; V-0: burning stops within 10 seconds on a vertical specimen; drips of particles allowed as long as they are not inflamed; 5VB: burning stops within 60 seconds on a vertical specimen; no drips allowed; plaque specimens may develop a hole; 5VA: burning stops within 60 seconds on a vertical specimen; no drips allowed; plaque specimens may not develop a hole. UL 94 provides additional classifications VTM-0, VTM-1, VTM-2 for thin films. UL 723 is another standard released by Underwriters Laboratories that provides a test for surface burning characteristics of building materials.

One way to make membranes for water vapor transport applications is to apply a thin coating of a thermoplastic polyurethane to a silica-polyethylene substrate. This approach has disadvantage that the substrate does not shrink away from flame. Therefore such membranes may not pass some flammability standards. Also, silica-polyethylene substrates tend to be thicker and less porous than desired. Typical silica-polyethylene substrates have thicknesses >95 microns and porosities of <60%. Thus such substrates result in membranes that offer higher resistance to water vapor transport than is desirable.

Another issue with ERV systems is that in cooling conditions where outside relative humidity and temperature are high, very high latent (moisture) transport is desirable. However, in colder climate conditions in a well-sealed building, high moisture transport may be less desirable as it may cause humidity to build up indoors. Optimal indoor RH is in the range of 30 to 55% to prevent discomfort and also to prevent growth of mold. Some system designers recommend HRVs as opposed to ERVs in 'heating primary' climates for this reason. In more extreme heating conditions, some level of moisture transport may be beneficial in the heating conditions prevent low indoor relative humidity, and also to minimize frosting and condensation in the core.

There is a need for membranes suitable for ERV applications and/or other water vapor transport applications that address some or all of these issues.

SUMMARY

This invention has a number of aspects. One aspect provides membranes having water vapor transport characteristics that are strongly temperature dependent. Such membranes may be incorporated into ERV systems. Another aspect provides ERV components (e.g. ERV membrane assemblies or ERV cores) that incorporate such membranes. Another aspect provides ERV systems that incorporate such membranes. Another aspect provides ERV methods that incorporate such membranes.

Another aspect of the invention provides methods for making water vapor transport membranes for ERV applications or for other applications. The methods may be adjusted to make ERV membranes and/or membranes for other applications that have water vapor transport properties that change significantly at a transition temperature. The methods may be adjusted to allow preparation of water vapor transport membranes having a selected or desired transition temperature or a transition temperature within a particular desired range. In some embodiments, the methods include a rehydration step that eliminates the transition to yield membranes that have water vapor transport properties that are relatively constant throughout a particular temperature range of, for example, 1° C. to 50° C. An example embodiment involves: applying a polymer layer to a substrate; allowing the layer to cure; and optionally performing a rehydration step on the cured layer.

Another aspect of the invention provides membranes comprising polyether-polyurethanes, on a microporous polyolefin substrate. In some embodiments, the polyether-polyurethanes are rehydrated. For example, such membranes may comprise a PEO-PU active layer on a PP substrate. Such membranes can provide high permeability to water vapor and high selectivity for water vapor.

An example aspect provides a water vapor transport membrane comprising a microporous polymeric substrate and an air-impermeable active layer coated on a surface of the substrate. The active layer comprises a polyurethane (PU) copolymer and a polar protic solvent in an amount of about 3% to about 100% of copolymer weight in the active layer. Molecules of the polar protic solvent are bonded to the PU copolymer.

An example aspect provides a water vapor transport membrane comprising a microporous polymeric substrate and an air-impermeable active layer coated on a surface of the substrate. The active layer comprises a polyethylene-oxide-containing (PEO-containing) copolymer and a polar protic solvent in an amount of about 3% to about 100% of copolymer weight in the active layer. Molecules of the polar protic solvent are bonded to the copolymer.

An example aspect provides a water vapor transport membrane comprising a microporous polymeric substrate and an air-impermeable active layer on a surface of the substrate. The active layer comprises a PEO-containing copolymer and a polar protic solvent. Molecules of the polar protic solvent are bonded to ethylene oxide groups of the PEO-containing copolymer. The active layer comprises polar protic solvent in an amount such that there are in the range of about 0.1 to about 2 molecules of the polar protic solvent bonded to the PEO-containing copolymer per ethylene oxide group in the PEO-containing copolymer.

An example aspect provides a water vapor transport membrane comprising a microporous polymeric flame retardant substrate and an active layer on a face of the substrate. The substrate has a porosity of at least 30%, a thickness of less than 75 microns, and has an inorganic solids content of less than 3%. The active layer comprises a cross-linked polyethylene-oxide-containing (PEO-containing) polyethylene-polyurethane copolymer and a polar protic solvent having one or more hydroxyl groups. Molecules of the polar protic solvent are bonded to ethylene oxide groups of the PEO-containing copolymer. The active layer comprises polar protic solvent in an amount such that there are in the range of about 0.1 to about 2 molecules of the polar protic solvent bonded to the PEO-containing copolymer per ethylene oxide group in the PEO-containing copolymer. The active layer is air-impermeable and water insoluble. The active layer has a thickness of 10 microns or less. The membrane is characterized by a permeability to water vapor of at least 2000 Barrer units over a temperature range spanning at least −5° C. to 40° C. and a selectivity ration for water vapor over carbon dioxide of at least 50.

An example aspect provides a water vapor transport membrane comprising a microporous polymeric substrate and an air-impermeable active layer on a surface of the substrate. The water vapor permeability of the membrane is at least 2000 Barrer units over a temperature range of about −5° C. to about 60° C.

An example aspect provides a water vapor transport membrane comprising a microporous polymeric substrate and an air-impermeable active layer on a surface of the substrate. The active layer is stabilized by bonding molecules of a polar protic solvent to the active layer such that a water vapor permeability of the membrane remains at least 90% of a water vapor permeability of the membrane as cast for a period of at least 7 days.

Another aspect provides water vapor transport membranes having switchable water vapor transport properties. For example a water vapor transport membrane comprises a microporous polymeric substrate and an air impermeable active layer coated on a surface of the substrate. The active layer comprises a PU copolymer having side chains and/or main chains that crystallize below a transition temperature. The membrane may have a first permeability to water vapor at temperatures above the transition temperature and a second permeability to water vapor at temperatures below the transition temperature. The first permeability may be significantly greater than the second permeability. The transition may occur rapidly with temperature such that permeability to water vapor changes by a factor of at least 2, 3 or 4 for a temperature change of 10 degrees Celsius.

Another aspect of the invention provides methods for making water vapor transport membranes for ERV applications or for other applications in which water vapor transport is required.

An example aspect provides a method for making a water vapor transport membrane. The method comprises applying a polyurethane dispersion (PUD) to a microporous polymeric substrate. The PUD is allowed to dry and cure for a curing period to form an active layer on the substrate. After the curing period the method contacts the active layer with a polar protic solvent and allows the active layer to take up and retain molecules of the polar protic solvent.

An example aspect provides a method for making a water vapor transport membrane. The method comprises applying a polymer coating to a microporous polymeric substrate. The polymer coating is allowed to dry and cure for a curing period to form an active layer on the substrate. After the curing period the method contacts the active layer with a polar protic solvent and allows the active layer to take up and retain molecules of the polar protic solvent. In some embodiments, the substrate is flame retardant, has a porosity of at least 30%, has a thickness of less than 75 microns, and has an inorganic solids content of less than 3%. In some embodiments, the polymer coating comprises a polyethylene-oxide-containing (PEO-containing) polyethylene-polyurethane copolymer and a crosslinker. In some embodiments, the polymer coating is allowed to dry and cure for a period of at least 24 hours to form the active layer. In some embodiments, the active layer is air-impermeable and water insoluble and has a thickness of 10 microns or less. In some embodiments, the polar protic solvent comprises molecules having one or more hydroxyl groups. In some embodiments, the molecules of the polar protic solvent are bonded directly to groups in the copolymer. In some embodiments, the membrane has a permeability to water vapor of at least 20000 Barrer units over a temperature range spanning at least −5° C. to 40° C. and a selectivity ratio for water vapor over carbon dioxide of at least 50.

An example aspect provides a method for making a water vapor transport membrane. The method comprises applying a polymer dispersion (PD) to a microporous polymeric substrate, the polymer coating comprising a polyethylene-oxide-containing (PEO-containing) copolymer. The polymer coating is allowed to dry and cure for a curing period to form an active layer on the substrate. After the curing period the method contacts the active layer with a polar protic solvent and allows the active layer to take up and retain molecules of the polar protic solvent. In some embodiments, the substrate is flame retardant, has a porosity of at least 30%, has a thickness of less than 75 microns, and has a inorganic solids content of less than 3%. In some embodiments, the polymer coating comprises a polyethylene-oxide-containing (PEO-containing) polyethylene-polyurethane copolymer and a crosslinker. In some embodiments, the polymer coating is allowed to dry and cure for a period of at least 24 hours to form the active layer. In some embodiments, the active layer is air-impermeable and water insoluble and has a thickness of 10 microns or less. In some embodiments, the polar protic solvent comprises molecules having one or more hydroxyl groups. In some embodiments, the molecules of the polar protic solvent are bonded directly to groups in the copolymer. In some embodiments, the membrane has a permeability to water vapor of at least 20000 Barrer units over a temperature range spanning at least −5° C. to 40° C. and a selectivity ratio for water vapor over carbon dioxide of at least 50.

An example aspect provides a method for making a water vapor transport membrane. The method comprises applying a PUD to a microporous polymeric substrate and allowing the PUD to dry and cure to form an active layer on the substrate. The active layer comprises a copolymer having side chains that crystallize below a transition temperature. The method comprises shifting the transition temperature by thermally cycling the membrane.

Another aspect provides a method for using a water vapor transport membrane. The water vapor transport membrane comprises a copolymer having side chains that crystallize below a transition temperature on a microporous substrate. At least a surface of the substrate contacted by the active layer is substantially free of materials that inhibit crystallization of the side chains. The method involves switching the active layer from a first state wherein the membrane exhibits a relatively low water vapor permeability to a second state wherein the membrane exhibits a much higher water vapor permeability by increasing a temperature of the membrane. In some embodiments the water vapor permeability of the membrane is changed by a factor of at least 2, 3 or 4 by a change in temperature of 10 degrees Celsius or less.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Figure 1:
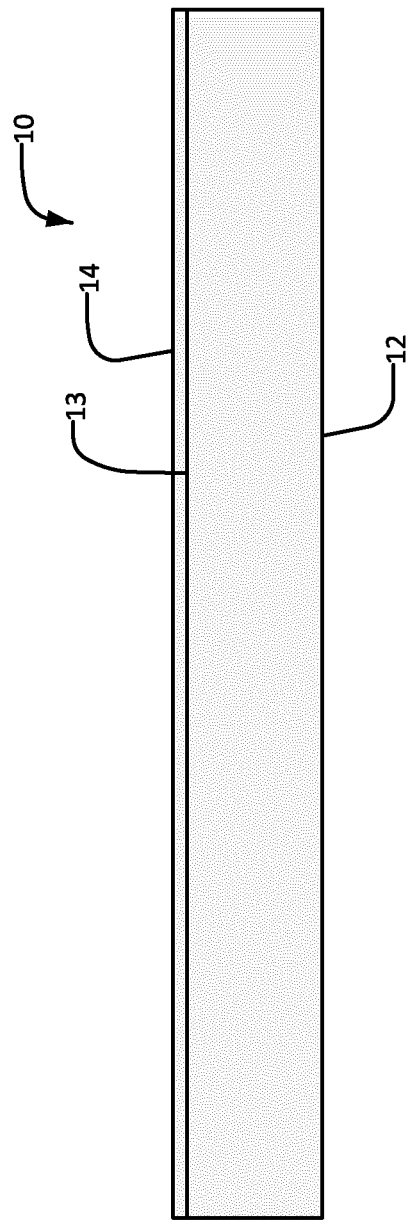
FIG. 1 is a schematic illustration showing a membrane according to an example embodiment.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

List of Definitions

AA—acetic acid

Barrer—gas permeability unit (1 Barrer=1×10$^{-10}$ cm$^3$ (STP) cm cm$^{-2}$ s$^{-1}$ cmHg$^{-1}$)

DCM—dichloromethane.

DMPA—dimethylpropanoic acid.

DSC—Differential Scanning calorimetry, an analytical technique in which the difference in the amount of heat required to increase the temperature of a sample and a reference material is measured as a function of temperature. Both the sample and reference are maintained at nearly the same temperature during the test.

ERV—Energy Recovery Ventilation. ERV is used to provide air exchange in buildings. ERV transfers both heat and moisture from outgoing air to incoming fresh air. ERV is performed using air-to-air heat exchangers that transfer both sensible heat and latent heat.

FTIR—Fourier Transform Infrared Spectroscopy.

GPU—gas permeance unit (1 GPU=1×10$^{-6}$ cm$^3$ (STP) cm$^2$ s$^{-1}$ cmHg$^{-1}$)

HMDI—hexamethylene diisocyanate.

IPDI—isophorone diisocyanate. IPDI may be reacted with polyol to form isocyanate prepolymers.

IPA—isopropyl alcohol.

MDI—diphenylmethane diisocyanate.

PBT—polybutylene terephthalate.

PCL—polycaprolactone.

PEO—polyethylene oxide. Polyethylene oxide is a synthetic polyether that can have a wide range of molecular weights. PEO typically has molecular weight of 100,000 g/mol or more. PEOs are amphiphilic and soluble in water as well as in many organic solvents (e.g., methylene chloride, ethanol, toluene, acetone, and chloroform).

PP—polypropylene.
PPG—polypropylene glycol.
PTFE—polytetrafluoroethylene.
PTMG—polytetramethylene glycol.
PU—polyurethane
PD—polymer dispersion. An aqueous system containing dispersed polymer particles. Aqueous dispersions are attractive for polymer coatings and membrane fabrication compared to solvent-based systems which have significant environmental, economic, and health implications associated with evaporating and exhausting solvents during the drying process.
PUD—polyurethane dispersion. Polyurethane dispersions (PUD) are a subgroup of PDs in which the polymer particles comprise particles of one or more TPUs.
RH—Relative Humidity.
Selectivity—The relative permeance or permeability of two chemical species through a membrane, where the higher permeability species is in the numerator. Selectivity for water vapor transport membranes is usually determined by measuring the water vapor permeance and the permeance of another gas that it would be desirable to separate water vapor from. For example, water vapor over oxygen selectivity, or water vapor over carbon dioxide selectivity. For example, a membrane with 10000 GPU water vapor permeance and 100 GPU carbon dioxide permeance has a selectivity for water vapor over carbon dioxide of 100.
TGA—Thermogravimetric Analysis. TGA measures changes in physical and chemical properties of materials as a function of increasing temperature and/or time.
TPU—Thermoplastic Polyurethanes. A family of polymers, which are highly customizable to offer a wide variety of end properties. TPUs are widely used in applications where toughness, durability, and broad temperature flexibility are required.
TDI—toluene diisocyanate.
WVT—Water Vapor Transport.

Membrane Structure

FIG. 1 shows a membrane 10 according to an example embodiment. Membrane 10 comprises a porous substrate 12 and an active layer 14 on a surface 13 of substrate 12. Active layer 14 is permeable to water vapor. For ERV applications active layer 10 is much more permeable to water vapor than it is to other materials (e.g. organic materials, gases).

In some embodiments, active layer 14 is coated on surface 13 of substrate 12 and an additional active layer is supported on a second surface of substrate 12 opposed to surface 13. If it is desired to protect from solvents, for example water, then active layer 14 may be sandwiched between two substrates 12. Where substrate 12 is porous and hydrophobic, water would be prevented or inhibited from reaching active layer 14 sandwiched therebetween.

Substrate

Advantageously, substrate 12 has a high porosity (e.g. a porosity of at least 30%) and/or is thin (e.g. has a thickness of less than 150 microns) and/or is hydrophobic. In some embodiments, the substrate has all of these features. Substrates of particular embodiments have a thickness that is <150 microns, preferably <50 micron, more preferably <35 microns and a porosity >25%, preferably >40%. In some embodiments, the pores of the substrate are significantly longer in a length dimension than they are wide. In some embodiments, an average pore area of individual pores in the substrate 12 is at least 15000 nm$^2$. In some embodiments, the pores of substrate 12 are smaller than 150 nm in at least one dimension.

Suitable substrates may be made from a microporous polymer, such as polyolefin or PTFE-based materials. In some embodiments, the substrate comprises a dry-stretched PP battery separator. Such separators are used, for example, in some lithium ion batteries. Such separators are commercially available and are reasonably inexpensive in commercial volumes.

In some embodiments, substrate 12 has the property that it does not inhibit crystallization of side chains of a polymer material of active layer 14. For example, surface 13 of substrate 12 may be substantially free of materials that tend to inhibit crystallization of side chains in active layer 14. In some embodiments, the side chains comprise PEO and surface 13 of the substrate is substantially free of materials that tend to inhibit crystallization of PEO. In some cases surface 13 of substrate 12 is substantially free of silica ($SiO_2$) and titanium oxide ($TiO_2$).

As described elsewhere herein, active layer 14 may comprise a polymer which includes PEO in its main chain and/or side chains. The presence in substrate 12 of $SiO_2$ or $TiO_2$ tends to inhibit crystallization of PEO groups in active layer 14. Without being bound by any particular theory of operation, this inhibitory effect appears to be associated with an interaction of PEO groups in the polymer with the $SiO_2$ and/or $TiO_2$ in the substrate. This is surprising since one would not expect silica or titanium oxide to interact with PEO in this manner. However silica-containing substrates can hold water molecules. Water from air or from aqueous coating processes may be retained on the substrate by the $SiO_2$ and/or $TiO_2$. This may lead to enough liquid water remaining at the substrate-polymer interface after drying of surface 13 to inhibit crystallization of the PEO.

In some embodiments, surface 13 of substrate 12 has the characteristic that it is not wetted by the material of active layer 14. For example, where active layer 14 comprises a polymer having PEO side chains, surface 13 may have the characteristic that it is not wetted by PEO.

In some embodiments, surface 13 of substrate 12 has a contact angle with water of less than 102 degrees and/or an average roughness $R_a$ of less than 0.8 µm.

Substrate 12 is preferably inherently flame retardant (made of one or more flame retardant materials) and/or tends to shrink away from high-temperature sources such as open flames. These properties help membrane 10 to pass flammability testing (e.g. according to UL-94, UL-723).

Substrate 12 may have any combination of the above characteristics.

Active Layer

Active layer 14 comprises a polymer that can crystallize within a temperature range near to that at which membrane 10 will be used. For example, a membrane 10 used in ERV applications may have a specified working temperature range of 0° C. to 40° C. and the polymer may crystallize within 15° C. of this range (i.e. in the range of −15° C. to 55° C. in this example).

In some embodiments, the polymer is a PEO-based copolymer, in which the PEO is responsible for polymer crystallization. The main chain and/or side chains of such polymers comprise PEO. PEO side-chain groups are less constrained and are more available to crystallize than groups present in the polymer main chain. In some embodiments, the PEO side chains have molecular weights in the range of 200 to 10000 Daltons. Other crystallizing polymer main chain and/or side chains are possible. Some examples are PCL and PTMG. Active layer 14 may, for example, comprise a copolymer which comprises ethylene oxide groups in which a significant number of the ethylene oxide groups are available for crystallization.

In some embodiments, the polymer comprises a plurality of different main chains and/or side chains. For example, the polymer may comprise a plurality of different main chains and/or side chains, each main chain and/or side chain type having a different molecular weight leading to a different melting temperature. For an ERV application the side chains may be chosen so that all of the side chains (or at least all of a group of side chains responsible for varying WVT properties in a temperature range of interest) may be in a melted state at temperatures above some threshold temperature (e.g. >25° C.) (i.e. all of these side chains may have melting temperatures below the threshold temperature).

As the temperature falls below this high-temperature threshold, different groups of the side chains may crystallize at successively lower temperatures. A membrane that incorporates an active layer with this property may provide very high water vapor permeability above the high-temperature threshold at which all of the side chains are in a melted state. At temperatures below a low temperature threshold all or most of the side chains may be crystallized. At such low temperatures, water-vapor transport through the membrane may be significantly reduced. At temperatures intermediate between the low-temperature threshold and the high-temperature threshold, some of the side chains may be in a crystalline form and some of the side chains may be in an amorphous form. In this intermediate temperature range the water vapor permeability of the membrane may have an intermediate value that changes with temperature.

By appropriately selecting side chains for the polymer of the active layer one may alter the functional relationship between water vapor permeability and temperature, for example, by making the transition between a low-permeability state and a relatively high-permeability state more gradual (e.g. by providing a wider range of side-chain weights) or more sharp (e.g. by making the side chains more homogeneous).

In some embodiments, the water vapor permeability of the membrane is affected by both temperature and humidity. In such embodiments, for the same temperature, higher humidity may cause water vapor permeability to be increased and lower humidity may cause water vapor permeability to be decreased. With such a membrane, if high humidity occurs at a lower temperature then the membrane can adjust to that by increasing its permeability to water vapor. A possible mechanism for such variations in WVT with humidity, which is observed in some polymers, is that at high humidity levels the polymer may partially wet, thereby disrupting crystallinity. Another possible mechanism is that water-vapor-absorptive additives in the coating may modify water uptake in the film layer at a relative humidity threshold thereby altering permeability and/or crystallinity of the polymer film layer.

In some embodiments, the polymer comprises blocks that are relatively long (e.g. have molecular weights of at least 1000 Daltons). In some embodiments, the polymer comprises 40% to 80% soft blocks by weight. In some embodiments, the polymer comprises 10% to 50% side chains by weight. In some embodiments, the side chains are relatively long (e.g. have molecular weights of at least 1000 Da). A polymer that has longer soft blocks in its main chain and/or longer side chains will have a greater propensity to crystallize as such polymers allow more movement and mobility generally facilitates crystallization. Thus, the melting temperature of the polymer may be altered by changing the length (and molecular weight) of the main chains and/or side chains.

In some embodiments, the polymer side chains include side chains having a melting temperature in the range of −15 to 50° C. In some embodiments, at least 50% of the polymer side chains have a melting temperature within this range.

The main chain of the polymer of active layer 14 may be cross-linked. The degree of cross-linking may be varied. In some embodiments, the main chain is cross-linked in the range of 0% to 16% total cross-linker by weight, preferably in the range of 5% to 12% total cross-linker by weight. Cross-linking may improve chemical stability and decrease solubility and swelling of the polymer in water.

One would normally wish to avoid polymers that tend to crystallize at or near the temperature range at which a membrane 10 will be used for ERV or other WVT applications. This is at least because the WVT across a crystallized polymer is significantly impaired in comparison to the WVT across the same polymer in a non-crystallized state.

In some embodiments, the polymer comprises a TPU. TPUs are widely commercially available and are highly customizable to offer a wide variety of end properties. TPUs may, for example comprise polyols and di-isocynates (e.g. TDI, MDI, HMDI, IPDI and others) that contain the urethane linkage, —RNHCOOR'—. Other polymers or co-polymers could provide the polymer main chain in the alternative.

Figure 2:
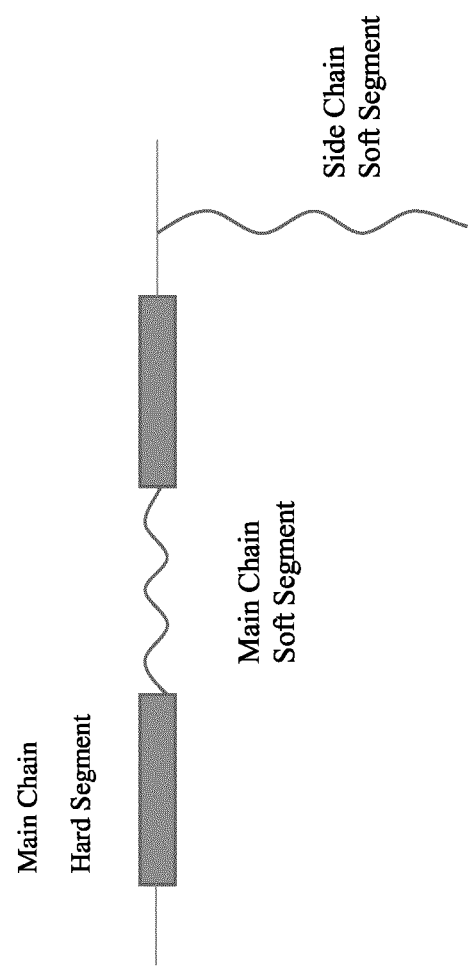
FIG. 2 is a schematic illustration showing a structure of an example polymer.

The general reaction for production of TPUs involves reacting a di- or polyisocyanate with one or more polyols, such as short chain diols ('chain extenders') and/or long chain polyols (typically diols). The resulting block copolymers contain 'hard blocks' (or 'hard segments') containing isocyanate groups connected by the short chain diols, and 'soft blocks' (or 'soft segments') containing the long chain polyols (see FIG. 2).

In some currently-preferred embodiments the polyols comprise glycols. Examples of glycols are that may be used are PEG and/or PEO which generally have the structure: HO—[—$CH_2$—$CH_2$—O-]n-OH, as well as PPG, polypropylene glycol.

Figure 3:
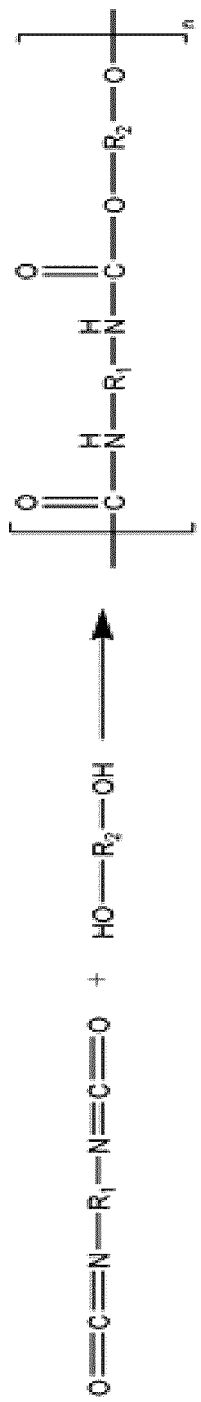
FIG. 3 illustrates an example chemical reaction for forming TPUs and the general structure of an example TPU.
Figure 4:
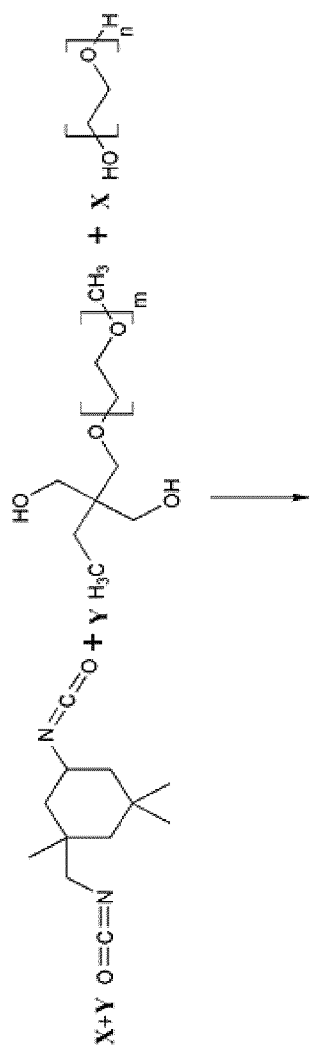
FIG. 4 illustrates an example chemical reaction by way of which a PE-PU copolymer having main chain and side chain PEO segments may be formed.
Figure 4:
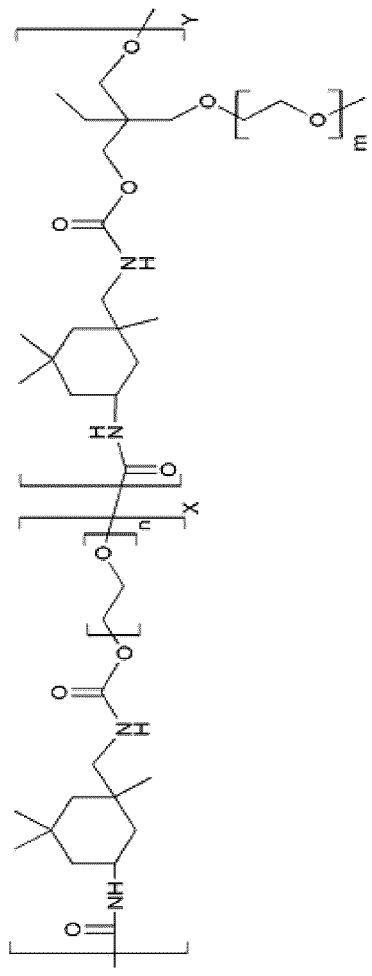

FIG. 3 illustrates a general example chemical reaction for forming TPUs and shows the general structure of an example TPU. FIG. 4 illustrates an example chemical reaction for forming a PEO-PU copolymer having main chain and side chain PEO segments may be formed. The reaction of an isocyanate with an alcohol group produces an ethyl carbamate or "urethane" linkage, and through a step growth addition polymerization process linear block copolymers are created. TPUs may be constructed using any of a broad range of monomeric building blocks (i.e. isocyanates and polyols) which can be incorporated in the final polymer to tailor the polyurethane functionality and properties. TPUs are often classified by the monomeric building blocks (e.g. isocyanates and polyols) used in their fabrication. Categorizations include aliphatic or aromatic diisocyanates and polyether or polyester diols.

In some embodiments, the polymer used is an aliphatic diisocyanate-polyether polymer. In some embodiments, the TPU main chain includes longer chain diols that provide secondary crystalline/amorphous regions in active layer 14. Such longer chain diols may make up, for example, 10% to 60% of the total polymer weight.

Polyurethane dispersions (PUD) are a subgroup of TPUs in which polymer particles are dispersed in an aqueous system. Aqueous dispersions are attractive for polymer coatings and membrane fabrication compared to solvent-based systems which have significant environmental, economic, and health implications associated with evaporating and exhausting solvents during the drying process. In formulating PUD, diisocyanate and diols are initially reacted to create a 'pre-polymer' which is then mixed in water in a secondary step where it is reacted with a 'chain extender' e.g. a short-chain diol to increase the polymer molecular weight. A dispersion of polymer particles in water remains at the end of the reaction.

Since the polymer in a PUD is in a water dispersion it may benefit from cross-linking once cast in order to improve chemical stability and decrease solubility in water. Polyurethanes often incorporate a number of active functional groups on which the cross-linking reaction can be based. These can include amine, hydroxyl, and/or carboxyl groups in the polyurethane. Cross-linking may be promoted by adding a cross-linker which reacts with these active functional groups. The degree of cross-linking may be controlled by varying the amount of cross-linker provided. Cross-linker may be added to the PUD before the PUD is applied to the substrate. Cross-linking occurs as the active layer dries on the substrate.

Suitable cross-linkers for polyurethanes include isocyanates, which will react with hydroxyl and amide functional groups, and carbodiimides and aziridines which will react with carboxyl functional groups. Some embodiments use aqueous polycarbodiimide dispersions as cross-linkers. Such dispersions are available for cross-linking aqueous polyurethane dispersions under room temperature conditions with good pot life. Cross-linking leads to a large increase in the polyurethane molecular weight, rendering the coating insoluble in place.

Carbodiimide cross-linking may be applied to cross-link carboxylic acid containing polyurethanes. A particularly appropriate cross-linker for aqueous polyurethane systems is an aqueous dispersion of polycarbodiimide from Stahl™, Picassian™ XL702. Carbodiimide groups in the cross-linker react with a carboxyl group in the urethane leading to an N-acyl urea bond. Acidic conditions are necessary as the carboxyl group must be protonated for the reaction to proceed. This is beneficial as the pot life will generally be extended in relatively neutral aqueous dispersions. After coating, during the drying process, the reaction will proceed as water evaporates from the dispersion and the carboxyl groups become most acidic and protonated. The manufacturer describes the reaction associated with polycarbodiimide as occurring on polymer drying as the pH drops and carboxyl groups in the TPU become activated. This reaction will greatly increase the molecular weight of the polymer, and the swell in water and solubility of the polymer in water should decrease.

In some embodiments, the active layer is formed from, PERMAX™ 230 polyurethane dispersion available from Lubrizol Advanced Materials. PERMAX™ 230 is an "aliphatic polyether waterborne polyurethane dispersion". The development and properties of PERMAX™ polymers are described in A. V. Lubnin, "*Novel, 'Breathable' Polyurethane Dispersions*," Paint & Coatings Industry Magazine, 2005 and in U.S. Pat. No. 6,897,281 both of which are hereby incorporated herein by reference.

The polyurethane polymer may contain between 12 and 80% by weight poly(alkylene oxide) side chains. The side chain monomer may, for example be incorporated into the polyurethane main chain from the polyol Tegomer™ D-3404, a polyether-1,3-diol available from Evonik with an average molecular weight of 1200 g/mol. Such side chain units allow the incorporation of a large amount of hydrophilic PEO into the polymer while still allowing workable aqueous dispersions to be made. In such embodiments the main chain unit also contains poly(alkylene oxide) in amounts less than 25% of the total weight which are incorporated through the use of a polyether polyol.

Making the PERMAX™ polymer involves reacting a diisocyanate or polyisocyanate, for example, IPDI, MDI, TDI) with a poly(alkylene oxide) side-chain diol and a poly(alkylene oxide) main chain diol in the presence of heat and a catalyst to generate a isocyanate terminated pre-polymer. Some preferred embodiments of the PERMAX™ polymers contain at least one compound which incorporates a cross-linkable functional group into the polymer. For example, DMPA may be used to add carboxyl functional groups to the polyurethane. The pre-polymer is then dispersed in water and reacted with a chain extender (e.g. hydrazine) to create the final polyurethane dispersion.

In some embodiments, the polymer contains PEO side chains which make up approximately ≥30% of the total weight of the polymer and total soft segments which make up approximately 65% of the total weight of the polymer. Such polymers may have ~1.7 to 2 parts diisocyanate hard groups to soft groups on a molar basis. One example of such a polymer is PERMAX™ 230. In some embodiments no main chain PEO is present. In other embodiments PEO is present in the main chain of the polymer. In some such embodiments, the ratio of side chain to main chain PEO is approximately 0.75 to 1.5 on a molar basis.

In addition or as an alternative, active layer 14 may comprise other block copolymers with PEO soft segments. Examples of such block copolymers include: polyether block amides such as PEBAX™, PEO-PBT, Polyetherpolyamides, polyether-polyurethanes, and other PEO-PU.

Method of Manufacture

Figure 5:
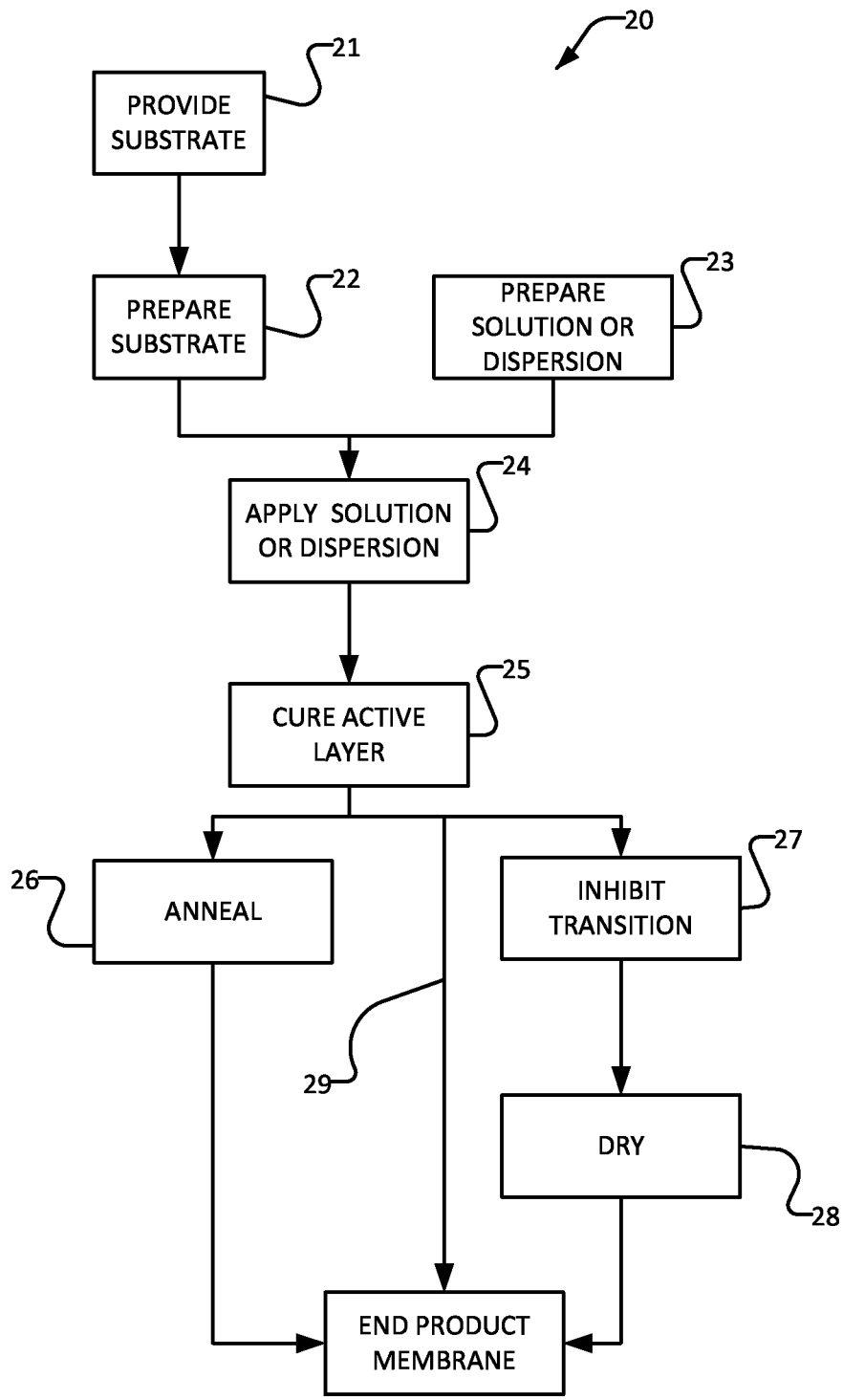
FIG. 5 is a flow chart which illustrates methods for making membranes according to some embodiments.

FIG. 5 illustrates a method 20 for making a membrane. In block 21 a suitable substrate is provided. The substrate may, for example, be as described above. In some embodiments, the substrate is a dry stretched or wet processed polypropylene/polyethylene substrate. In optional block 22 the substrate is prepared to receive the active layer 14. Block 22 may, for example, comprise corona treatment of the substrate.

In block 23 a solution or dispersion is prepared for use in forming the active layer. The solution or dispersion contains the polymer and optionally contains other additives. Additives that may be included in the solution or dispersion include: surfactants (e.g. a non-ionic surfactant such as Triton™ X-100), lithium chloride, antimicrobials, sorption additives, inorganic additives such as silica, titanium, and alumina, and/or plasticizers such as PEG 200.

Aqueous dispersions are preferred in order to avoid the use of solvents that have negative environmental impacts and/or require special handling. In example embodiments the solids content of the solution or dispersion is in the range of 20 to 40% solids by weight. Using solutions or dispersions with lower solids content allows for thinner film layers. However, such solutions or dispersions have higher water content which makes wetting the substrate and forming a continuous film (active layer) on the substrate more challenging.

The polymer is preferably cross-linked. Cross-linking of the polymer may occur primarily between 'cross-linking groups' in or near urethane 'hard blocks'. The cross-linking groups are preferably carboxyl groups. Cross-linking of the polymer increase the chemical stability of the polymer and helps to make the active layer less soluble in water after application.

In block 24 the solution or dispersion prepared in block 23 is applied to the substrate to create the active layer. Without being limited to a specific method, application may, for example comprise gravure coating, meter rod coating, roll coating, slot die coating and spray coating. Slot die coating is preferred to provide thin uniform coatings on the substrate surface.

In block 25 the active layer is dried and cured. After curing, a continuous dense film layer of polymer covers the substrate surface. The dense layer is substantially free of 'micro' pores. In some embodiments, the thickness of the active layer is in the range of 0.5 to 10 microns (for example, a coating weight of ~0.5 to 10 g/m$^2$).

Curing may be performed by drying the active layer. This may be done in air. In some embodiments, curing comprises drying the coated substrate in air at a temperature of 20° C. to 90° C. for a period of 2 hours or more. Drying may be expedited by heating the active layer. For example, in other embodiments drying occurs in a roll to roll process in a heated convection oven and under IR heating. In such embodiments, drying of the active layer may be completed in a time on the order of 30 seconds or even less.

Blocks 26 and 27 provide post-curing steps to modify the characteristics of the active layer. In some embodiments, neither of blocks 26 and 27 is performed (as indicated by arrow 29). In some embodiments, block 26 is performed. In some embodiments, block 27 is performed. In some embodiments, both of blocks 26 and 27 are performed.

Block 26 is an annealing step in which the coated substrate is held at an elevated temperature (e.g. a temperature in excess of a transition temperature of the polymer in the active layer) for a period of time and then cooled at a specific rate. Block 26 may have the effect of depressing the transition temperature.

Block 27 is a transition-inhibiting step which involves incorporating molecules of a polar solvent into the active layer. Block 27 may comprise, for example contacting the active layer with a liquid polar solvent for sufficient time to allow molecules of the polar solvent to enter the active layer and bind to the polymer side chains. The solvent is preferably a protic polar solvent such as water, isopropyl alcohol, methanol or ethanol.

Non-protic polar solvents such as acetone may be used in block 27 in cases where it is desired to not completely eliminate a transition in the polymer. IR studies of a membrane soaked in acetone after curing show that some crystallization was still present in the PEO groups in the coating after the acetone soak.

In some embodiments, block 27 comprises contacting the active layer with liquid water. This may be performed at room temperature or above. Contacting with liquid water may comprise, for example, spraying, misting or dipping. At room temperature even a very short period of contact (e.g. 1 second) can be sufficient for enough water to be taken up to substantially eliminate crystallization of PEO in the active layer.

Without being bound to any particular theory of operation, it is believed that an effect of block 27 is that PEO segments of the polymer become attached to molecules of the solvent by hydrogen bonds. The solvent (e.g. water) becomes 'bound' in place rather than being in the form of liquid water.

After block 27, water may be present in three states in the polymer: bound, bound-freezing, and freezing. Bound water binds directly to segments in the polymer (e.g. PEO segments in the polymer) via hydrogen bonding. Bound water in the polymer will not freeze at any temperature. Bound-freezing water is associated directly with the bound water in the polymer via hydrogen bonding within the hydration shell of the polymer. Bound-freezing water is not directly bound to the polymer itself. Bound-freezing water freezes at temperatures below the normal freezing point of water. Freezing water is free (i.e. not bound to the polymer). Freezing water freezes at the normal freezing point of water.

Only a fraction of the PEO segments in the polymer needs to be bound by bound water to prevent crystallization of active layer 14. The theoretical maximum amount of bound water is 2 molecules of water per ethylene-oxide monomer in the polymer. For a polymer that is 70% by weight PEO segments, 2 molecules of water per ethylene-oxide monomer corresponds to the bound water having a weight equal to about 40% of the polymer weight. Generally, significantly less than 2 molecules of water per ethylene oxide monomer in the polymer can suffice to prevent crystallization of the PEO segments. It has been found that a very small uptake of water into the active layer can suffice to prevent crystallization of PEO groups in the active layer. Bound water associated with a small fraction of ethylene oxide groups can disrupt crystallinity and prevent further crystallization.

In some embodiments, block 27 results in an increase in the mass of the active layer in the range of 3% to 100% (i.e. the amount of solvent that becomes bound to the polymer in the active layer in block 27 is in the range of 3% to 100% of the weight of the polymer). Where the solvent is water a preferred range is 3% to 30% of the polymer weight, more preferably 3% to 10% of the polymer weight. Excessive water take up can cause swelling of the active layer.

The amount of water taken up by the active layer can be controlled by adjusting the time that the active layer is contacted with liquid water as well as the drying time during which excess water is removed. For example, in a roll-to-roll process the line speed, the application method, and the drying conditions will influence the amount of water incorporated into the membrane. A desired amount of water uptake can typically be achieved in 1 to 30 seconds of exposure to liquid water.

Spectroscopic methods such as FTIR may be used to evaluate whether a membrane has been treated as described herein. Presence of water in the membrane causes a shift at a wavenumber of ~1100 cm$^{-1}$ in the IR. This shift is associated with —C—O—C— bonds in the PEO groups. Also, for membranes that have not been subjected to block 27, PEO—CH$_2$— results in clear peaks at 1344 cm$^{-1}$ and 1359 cm$^{-1}$ which are associated with the —CH$_2$— in crystallized PEO. These peaks are absent or at least much less pronounced after block 27 treatment. Membranes which are subject to complete treatment have a broad peak at 1349 cm$^{-1}$ associated with the —CH$_2$— in amorphous PEO.

In block 28 the membrane is dried. Drying may comprise, for example, drying in air until substantially all excess surface water is removed. In some embodiments, block 28 is performed at a temperature that is elevated relative to room temperature (e.g. a temperature in the range of 25° C. to 80° C.).

In a method according to an example embodiment, a membrane 10 is prepared by applying an active layer comprising a co-polymer comprising PEO side chains to a stretched PP substrate 12. The application may be performed by applying an aqueous dispersion comprising the polymer and a cross-linker to the substrate. The active layer is allowed to cure until the active layer covers a surface of the substrate continuously and is mostly free of water. After curing the active layer is subjected to a rehydration step that involves contacting the active layer with a liquid polar solvent, for example water. Preferably during this rehydration step the solvent is water and the active layer is allowed to take up water in an amount equal to 3% to 30% of the polymer weight, more preferably 3% to 10% of the polymer weight.

On a molecular basis, water take-up in the amount of 3% to 30% of the polymer weight corresponds to about 0.1 to 1.1 bound water molecules per ethylene oxide group in the polymer. Water take-up in the amount of 3% to 10% of the polymer weight corresponds to about 0.1 to 0.4 bound water molecules per ethylene oxide group. Water take-up within these ranges is typically sufficient to prevent crystallization of the PEO segments of the polymer and prevent active layer crystallization.

Switching

By appropriate selection of a polymer and substrate one can create a membrane in which the WVT can be switched between a state in which the membrane provides a relatively high permeability to water vapor and a state in which the membrane provides a much lower permeability to water vapor. Switching between these two states may be temperature controlled. In some embodiments, the water vapor permeability of the two states differs by a factor of at least 3, or at least 7 in some embodiments.

Such switching may be applied, for example, to provide an ERV core with a membrane that provides high permeability to water vapor at higher temperatures (e.g. >25° C.), and lower permeability to water vapor at lower temperatures (e.g. <25° C.). Such an ERV core may perform better than a heat recovery ventilation (HRV) (i.e. thermal transfer only) core by returning some (but not too much) moisture to the indoor space in heating conditions. Allowing some moisture transport at sub-zero outdoor conditions allows the ERV core to operate at lower temperatures without requiring defrosting. This improves the overall efficiency of the system.

Table 1 illustrates desirable water vapor permeability for ERV cores as a function of temperature:

TABLE 1

| | | | | | | | |
|---|---|---|---|---|---|---|---|
| AHRI 1060 Standard Conditions | | | | | | | |
| North | | Outdoor Condition | | | Indoor Condition | | Moisture |
| American Season | HVAC Operation | T (° C.) | RH (%) | gH$_2$O/ kg air | T (° C.) | RH (%) | gH$_2$O/ Permeability kg air Required |
| Summer | Cooling Condition | 35 | 47 | 16.7 | 23.9 | 52 | 9.6 HIGH |
| Winter | Heating Condition | 1.7 | 82 | 3.5 | 21.1 | 48 | 7.5 MODERATE to LOW |
| Extreme | | −20 | 100 | 0.6 | 21.1 | 48 | 7.5 MODERATE |

In order to achieve a 'switching effect' the polymers preferably include components (e.g. side chains) that have a melting point or other transition within the range of interest for the switch. In some embodiments, such components are present in microdomains within the active layer. The structure of the components within the microdomains may change from crystalline to amorphous depending on the temperature.

A polymer with a significant proportion of side chains (e.g. >20% of the side chains) in which the side chain polymer has a melting point of 45° C., will have a switch temperature at ~45° C. when the side chain polymer is incorporated into the co-polymer. However since the co-polymer contains hard segments which are higher melting (e.g. >180° C.) and/or have cross-linking, the co-polymer will still be a solid even after the side chain 'soft segments' melt such that membrane 10 can retain its structural integrity even at temperatures above the melting point of the side chains.

This switching behavior was initially observed as a very significant decrease in water-vapor permeability of membranes that occurred within a few hours or a day after making the membranes by deposition of an active polymer layer on a PP substrate. It was found that heating the membranes to a threshold temperature caused water-vapor permeability of the membranes to greatly increase. The water-vapor permeability of the membranes returned to the relatively low value when the membranes were cooled back to room temperature.

When TPU coatings were applied to PP substrates, immediately after coating the resulting membranes had reasonably high water-vapor permeability at both 25° C. and 50° C. After that there was a rapid decrease in water vapor permeability at 25° C. This decrease did not occur when the identical polymer was applied to silica-loaded polyethylene substrates.

The decrease in water-vapor permeability at 25° C. generally occurred rapidly—in less than 24 h (as little as 3 h after coating), but crystallization times will depend on the specific polymers and the ambient conditions. Water vapor permeability measured isothermally at 50° C. remained normal. Table 2 shows results of experiments which demonstrate this effect. The 'Day 1' column reports water-vapor permeability measured within a few hours of coating and drying the polymer. The 'Day 2' column reports water-vapor permeability measured approximately 24 hours later. The samples were dry stretch polypropylene battery separators (PP) coated with PERMAX™ 230 (PU) at four levels of Stahl™ XL-702 polycarbodiimide cross-linker (XL). The samples are reported in thickness normalized and vapor pressure differential normalized flux (permeability) for the film layer only in Barrer units (1×10$^{-10}$ cm$^3$ (STP) cm cm$^{-2}$ s$^{-1}$ cmHg$^{-1}$), but all membranes had coatings in the range of 0.8 to 1.4 g/m$^2$ and samples were coated and dried at room temperature.

TABLE 2

| | | | | |
|---|---|---|---|---|
| Water vapor permeability of membranes | | | | |
| | | Day 1 | Day 2 | |
| Membrane | % Cross- linker | Permeability 25° C. (Barrer*) | Permeability 25° C. (Barrer) | Permeability 50° C. (Barrer) |
| PP-PU-0% XL | 0 | 47752 | 5332 | 39819 |
| PP-PU-3% XL | 3 | 37659 | 3658 | 43574 |

TABLE 2-continued

Water vapor permeability of membranes

| Membrane | % Cross-linker | Day 1 Permeability 25° C. (Barrer*) | Day 2 Permeability 25° C. (Barrer) | Day 2 Permeability 50° C. (Barrer) |
|---|---|---|---|---|
| PP-PU-6% XL | 6 | 36772 | 4210 | 38002 |
| PP-PU-12% XL | 12 | 26470 | 4443 | 28426 |

*Film layer permeability in Barrer units is flux normalized for film layer thickness and vapor pressure differential. Substrate and boundary layer water vapor transport resistances are subtracted from the observed resistance to determine the water vapor transport resistance of the film layer. Feed stream humidity was 50% relative humidity at the stated temperature; sweep stream was 0% RH at the stated temperature.

Figure 6:
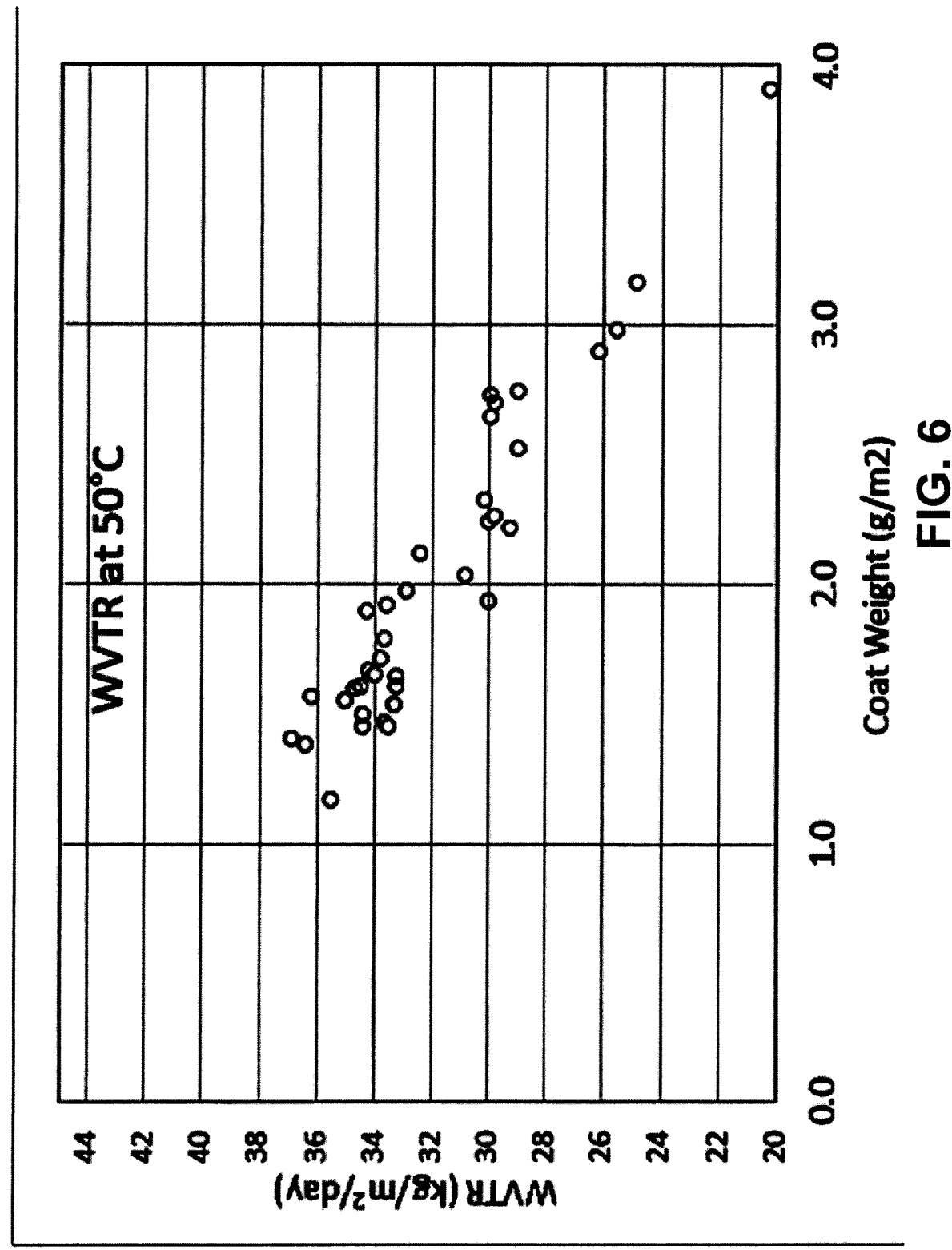
FIG. 6 is a graph illustrating the relationship of water vapor transport to coating weight for an example embodiment.
Figure 7:
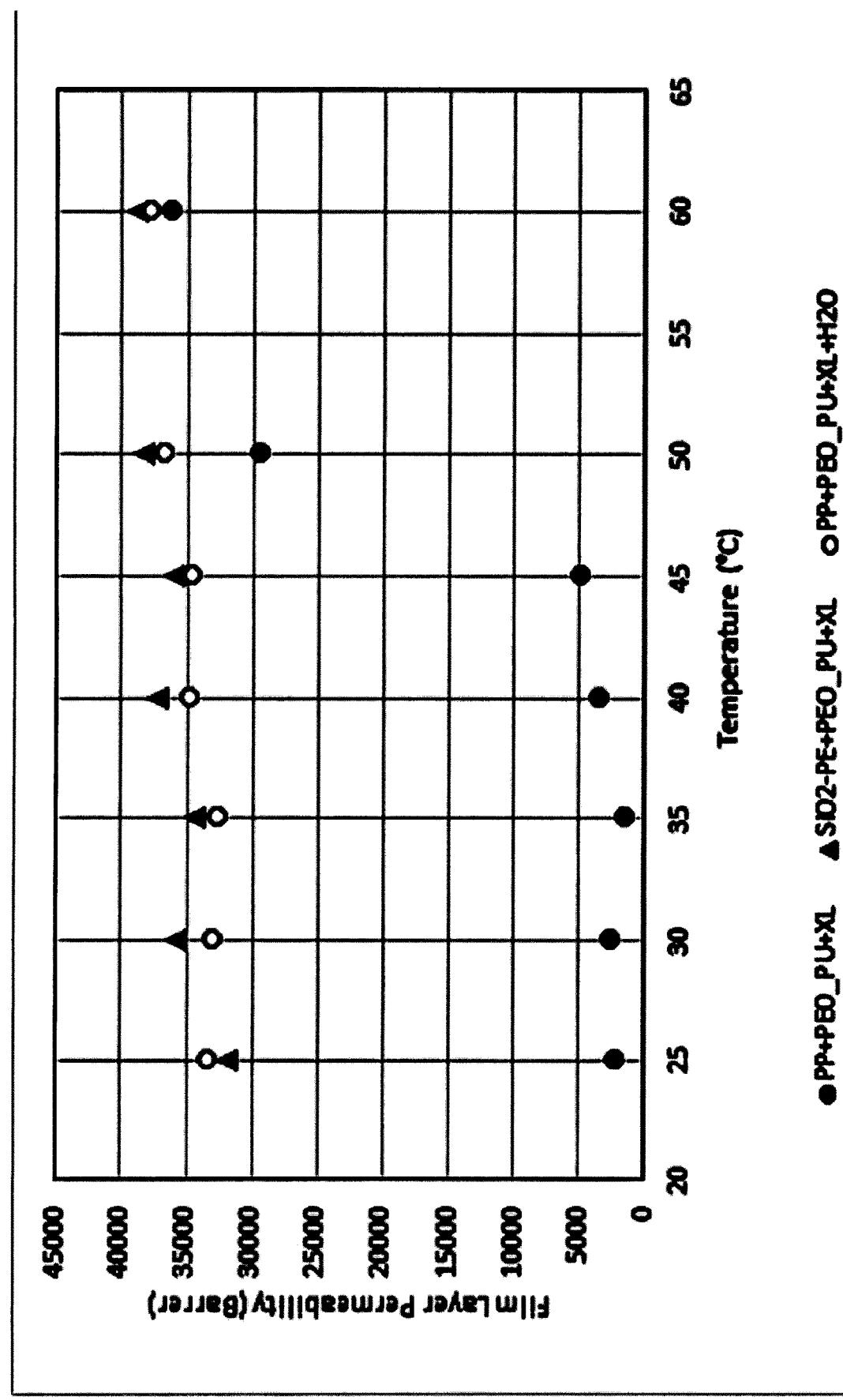
FIG. 7 is a graph illustrating the relationship of water vapor permeability in the film layer of a membrane to temperature for PEO-PU coated on a silica-loaded polyethylene substrate and coated on a PP substrate, the latter with and without rehydration.

At temperatures of 50° C. and above the membranes performed as expected for all thicknesses. Water vapor flux at 50° C. (not normalized for thickness) decreases linearly with increasing thickness or coating weight (see FIG. 6). The water vapor permeability of the membranes was significantly lower than expected at temperatures below 50° C. (see FIG. 7), where the membrane based on a PP substrate shows significant temperature dependence on water vapor permeability. This effect was not observed when samples were coated on silica-polyethylene substrates where permeability to water vapor is essentially the same at all temperatures. FIG. 7 shows the temperature dependence of the water vapor permeability of membranes made by casting a cross-linked PEO-PU polymer on two substrates. One substrate (PP substrate) is a dry stretch polypropylene. The other substrate (SiO$_2$—PE) is a silica-loaded polyethylene substrate. The effect of adding water to the PP substrate coated with PEO-PU is shown as well.

It is believed the temperature-controlled permeability of the membranes made with the PP substrate is associated with crystallization and melting of soft segments in the copolymer (further discussed herein). This would lead to a decrease in polymer mobility and thus a decrease in water vapor diffusion through the polymer. As the temperature increases the portion of the polymer that is crystallized melts, leading to an increase in polymer mobility and an increase in permeability at higher temperatures.

Switching—Control of Switching Temperature

The temperature at which the WVT properties of a membrane as described herein change can be controlled by selection of the polymer used for active layer 14 and also by treatments applied to the membrane. The switching effect is more pronounced for thicker active layers 14.

Temperature Control—Annealing

The transition temperature at which the water vapor permeability of a membrane 10 changes can be reduced by performing an annealing step in which the membrane is held at an elevated temperature for a period of time and then cooled a specific rate. The elevated temperature is preferably at least equal to the transition temperature.

Heating and then cooling effects the crystallization of the PEO side chains. Heating above 50° C. causes the side chain polymer segments to melt, and then recrystallize on cooling with a different transition point. Table 3 shows results of experiments which demonstrate this effect. The PEO-PU samples were cross-linked with 7% cross-linker and dried at room temperature, in the study of the thermal transitions observed in the materials the samples were heated to the maximum temperature indicated before cooling at a rate of 10° C./min to −75° C., before the next heating cycle was measured. Here Tg is the soft segment glass transition, while Tx,1 and Tx,2 are believed to be associated with melting of PEO crystalline segments in the polymers.

TABLE 3

Transition temperatures at which the water vapor permeability changes

| | Thermal Transitions | | | |
|---|---|---|---|---|
| Max Temp. (° C.) | Tg, s (° C.) | Tx, 1 (° C.) | Tx, 2 (° C.) | ΔH, 2 (W/g) |
| 25 | −52 | 27.2 | 49.5 | .08672 |
| 55 | −52.4 | 28.1 | 52.9 | 0.0424 |
| 75 | −53.0 | 28.4 | 55.0 | 0.01585 |
| 95 | −52.6 | 27.8 | — | — |
| 115 | −52.3 | 27.5 | — | — |
| 135 | −53.4 | 27.4 | — | — |
| 155 | −52.0 | 32.2 | — | 0.1941 |
| 175 | −52.0 | 30.4 | — | 0.6757 |
| 195 | −53.3 | 29.5 | — | 1.247 |

Another way to control the transition temperature is to include additional materials such as lithium chloride and/or a surfactant such as Triton™ X-100 in active layer 14.

Addition of Lithium Chloride

In these samples, PEO-PU polymer (PERMAX™ 230) films with 7% cross-linker and different ratios of lithium chloride were created. Table 4 shows results of experiments which demonstrate the effect on WVT as the LiCl content is increased. With 4% LiCl, water vapor permeability at 25° C. is maintained. The thermal transition associated with the PEO crystalline segment melting is modified with increasing LiCl content in the membrane.

TABLE 4

Transition temperatures at which the water vapor permeability changes as a function of LiCl content

| LiCl Content in coating | Permeability, 25° C. (Barrer) | | Permeability 50° C. (Barrer) | Thermal | |
|---|---|---|---|---|---|
| | Day 1 | Day 2 | | Tg(s) | Tx(2nd) |
| 0% LiCl | 37774 | 4424 | 41145 | −52.2 | 30.4 |
| 1% LiCl | 35644 | 9134 | 47363 | −56.8 | 16.1 |
| 2% LiCl | 37867 | 41616 | 57628 | −59.2 | 12.5 |
| 4% LiCl | 58903 | 63258 | 125367 | — | — |

Inhibiting Switching

Some embodiments apply a process for inhibiting switching such that a polymer that would otherwise provide dramatically reduced permeability to water vapor at lower temperatures (e.g. temperatures below melting points of most or all of the PEO side chains of the polymer in the active layer) will retain a high permeability to water vapor (e.g. a permeability of at least 20000 Barrer) even at such lower temperatures.

The transition can be substantially eliminated by a process that involves contacting membrane 10 with a liquid polar solvent after active layer 14 has cured. The polar solvent is water in preferred embodiments.

It is believed that allowing active layer 14 to take up water (or another polar protic solvent) will create a significant number of hydrogen bonds to the PEO groups. The presence of such bonds is a possible explanation for the effect on WVT of contacting the active layer 14 with water. Such hydrogen bonds may stabilize the polymer against crystallization. Suitable solvents include water, methanol, and ethanol. Of these, solvents having smaller molecules are preferred. Solvents having larger molecules (e.g. ethanol, IPA) will generally have a lower tendency to stay bound in the polymer than smaller molecules such as water.

Acetone may be used in an alternative, although FTIR studies show that contact with acetone does not completely inhibit crystallization of PEO groups in the samples tested. The PEO side chains in the tested samples were soluble in acetone. This explains why acetone can disrupt crystallization of PEO side chains, but will not stabilize the side chains through hydrogen bonding as water is thought to do. It was found that acetone vapor also served to disrupt crystallization in the polymer. WVT performance was recovered after exposing samples of the membrane to acetone vapor (saturated at 50° C. and saturated at 25° C.).

Table 5 indicates the results of experiments in which similarly-prepared samples each comprising a layer of polymer on a PP substrate were contacted with different solvents after curing. Samples were made up of a PP substrate coated with a PEO-PU polymer with 7% cross-linker. The samples were dried at room temperature prior to testing. For solvent testing, the samples were exposed briefly to the liquid solvents. It can be seen from Table 5 that washing with water, ethanol, isopropyl alcohol and acetone all yielded samples having permeability to water vapor more than twice the permeability of an unwashed control sample. Washing with hexane did not yield this effect.

TABLE 5

Effect of contacting cured membranes with various solvents

| | Flux at Time (kg/m$^2$/day), 25° C., 50% RH in feed | | | |
|---|---|---|---|---|
| | After Treatment | Day 3 | Day 5 | Day 10 |
| Control (No treament) | 3.390 | 3.182 | 3.459 | |
| Water | 8.716 | 8.278 | 8.826 | 8.233 |
| Isopropyl Alcohol | 8.614 | 8.659 | 8.577 | |
| Ethanol | 8.525 | 8.609 | 8.583 | |
| Acetone | 8.556 | 7.591 | 8.023 | |
| Hexane | 2.426 | 2.089 | 2.152 | |

Samples rehydrated with water were heated to temperatures up to 150° C. This heating did not appear to drive out the water that had been taken up by the active layer in the rehydration step. The water appears to have been 'bound' in place in the active layer. DSC performed during the heating indicated very little endothermic activity (meaning that there was no significant evaporation of water from the active layer during the heating).

Inhibition of switching was not observed when cured samples were exposed to water vapor instead of liquid water. In one test, exposure to water vapor (~95% RH) at 50° C. did not have the effect of improving permeability to water vapor at lower temperatures.

Another way to inhibit the transition that causes a reduction in WVT at lower temperatures is to add lithium chloride to the active layer. Addition of 4% by weight of lithium chloride prevented the reduction in WVT. It is expected that other hygroscopic salts would have the same effect; however the addition of these salts effects may alter manufacturing and durability of the membrane film layer.

Additional Treatment Steps—Corona Treatment

In some embodiments, surface 13 of substrate 12 is subjected to corona treatment before active layer 14 is applied. Corona treatment may improve the wettability of surface 13 and thereby promote deposition of an even active layer 14. Corona treatment involves using a high voltage electric discharge in which electrons break polymer surface bonds creating free-radicals which, in the presence of air, creates various oxygen containing functional groups on the substrate surface. The presence of these functional groups increases surface energy and improves wetting. Corona treatment may be used to improve the 'wettability' of low surface energy substrates including polyolefins such as polypropylene and polyethylene.

Samples of dry process-microporous polypropylene battery separator material were corona treated and then coated with PEO-PU. Control samples were prepared in the same manner but without the corona treatment. The corona-treated samples were compared against the control samples and then 'rehydrated' and tested to compare performance of the corona-treated samples with other samples that were not corona treated. The performance of the corona treated samples was generally similar for the samples after rehydration, while the untreated samples had very low performance without hydration, indicating that the corona treatment of the material worked to prevent significant crystallization. Table 6 shows results of experiments which demonstrate this effect.

TABLE 6

Effect of Corona Treating Membranes

| | Flux (kg/m$^2$/day), 25° C. | |
|---|---|---|
| | After Casting and drying | After rehydration |
| Control Samples | 1.7 | 7.7 |
| Corona 1 | 6.7 | 7.3 |
| Corona 2 | 5.6 | 7.2 |
| Corona 3 | 7.0 | 6.9 |

However FTIR scans of the samples demonstrated that there was PEO in the crystalline state in the membranes. Also, samples which were tested after some time showed that the corona-treated samples decreased in performance indicating that crystallization still occurred slowly.

Additional Treatment Steps—Addition of Surfactant

Triton™ X-100 (CAS #9002-93-1) was added to the PEO-PU polymers prior to coating of the PP substrates. The addition of Triton™ X-100 appears to improve performance loss at high loadings of Triton™ X-100. However, even with high loadings of Triton™ X-100, water vapor permeability was observed to decrease over time. the addition of Triton™ X-100 did not appear to have any significant effect on transition temperatures. Table 7 shows results of experiments which demonstrate the effects of addition of Triton™ X-100.

TABLE 7

Triton™ X-100 addition

| % Triton 100X in coating layer | WVT 25° C. (kg/m²/day) Day 1 | WVT 25° C. (kg/m²/day) Day 5 | After Wash | Tg(s) | Thermal Tx, ° C. As cast | Tx, ° C. After heating |
|---|---|---|---|---|---|---|
| 0% Triton™ X-100 | 8.6 | 2.6 | 8.5 | −53.1 | 51.0 | 28.7 |
| 0.5% Triton™ X-100 | 8.1 | 2.9 | 8.0 | −49.2 | 50.3 | 36.6 |
| 1% Triton™ X-100 | 8.1 | 2.3 | 8.1 | −49.3 | 50.3 | 35.6 |
| 2% Triton™ X-100 | 8.2 | 5.3 | 8.2 | −52.1 | 48.0 | 32.8 |
| 4% Triton™ X-100 | 8.1 | 5.7 | 8.1 | −50.7 | 49.8 | 31.3 |

All samples were coated on a dry stretched PP substrate. Triton™ X-100 was added in different loadings to the PEO-PU coating solution prior to drying overnight in ambient conditions.

Triton™ X-100 at 2% and 4% loading (total mass in coating) both appear to significantly reduce performance degradation; however water-vapor permeability at 25° C. still drops significantly over a two week period.

Washing the samples in water appeared to reverse any performance loss. This recovery of water vapor permeability appeared to be permanent. Table 12 shows results of experiments which demonstrate this effect. The samples in Table 12 were made of a dry stretch PP substrate coated with a formulation of PEO-PU with 7% cross-linker and different loadings of Triton™ X-100. The samples were then dipped in liquid water and then tested.

Cross-Linking

Increasing the amount of cross-linker decreases absorption of water up to ~15% cross-linker weight by solids. The total liquid water uptake of samples of PERMAX™ 230 at different levels of XL-702 cross-linker are shown in Table 8. Increasing the amount of cross-linker decreases the swelling of the polymer in water, at least up to 9% cross-linker by weight. At higher amounts of cross-linker there are less significant changes in swelling, indicating that higher levels of cross-linking have less impact on swelling and water uptake in this system.

TABLE 8

| Samples (XL:PU wt.) | Wt. % Cross-linker | Mass % Water Uptake at Steady State |
|---|---|---|
| 0 | 0 | 134 |
| 1:25 | 3.85 | 113 |
| 1:20 | 4.76 | 108 |
| 1:15 | 6.25 | 102 |
| 1:10 | 9.09 | 92 |
| 1:5 | 16.67 | 87 |

DSC studies show that there is little effect on the crystallization of the soft segments associated with cross-linking. Since the cross-linking is occurring on the 'hard' PU segments of the polymer, there is little impact on the PEO crystallinity.

Rehydration/Wetting

Switching may be turned off to maintain high performance of the membranes over a wider range of temperatures by applying a 'rehydration' step. The rehydration step may be short (e.g. a 1 second dip in room temperature water). After initially drying and then rehydrating the membrane performance returns to the expected level. Table 9 shows results of experiments which demonstrate this effect.

TABLE 9

| Condition | Measured weight of water in polymer (%) | Tg(s) | Thermal Tx, ° C. After heating |
|---|---|---|---|
| Room Temp and humidity | 2.7 | −51.0 | 28.3 |
| 1 s soak | 3.4 | −51.5 | — |
| 30 s soak | 6.4 | −51.5 | — |
| 90 s soak | 12.2 | −52.9 | — |
| 150 s soak | 21.2 | −60.8 | — |
| 900 s soak | 36.8 | n.m. | — |
| 50% wt. water added | 43.8 | n.m. | — |
| 75% wt. water added | 68.3 | n.m. | — |
| Saturated in water (72 hours) | 94.7 | n.m. | — | n.m. = not measured

The following samples were coated with a PEO-PU-6% XL coating on dry stretched PP. After coating, hydrating and drying the samples retain high membrane performance. No initial performance reduction was observed for a non-hydrated sample kept at 50° C. (dry condition) since this temperature is above the PEO melting point. However, performance was observed to drop when the sample was left at ambient conditions. Table 10 shows results of experiments which demonstrate this effect.

TABLE 10

| Samples (PP + PU + XL) | WVT 25° C. (kg/m2/day) As Cast | 24 h | 96 h | 144 h |
|---|---|---|---|---|
| Coated and kept in 50° C. oven for 24 h | 8.1 | 7.4 | 2.8 | 3.2 |
| Coated, dried, rehydrated @24 h before test | 7.6 | 7.8 | 7.4 | 7.9 |
| Washed substrate, dry, coated, dried | 8.0 | 2.1 | 2.7 | — |
| Coated and dried | 8.1 | 2.3 | 2.8 | — |

All samples maintained performance after hydration for even a short period (30 seconds), whether they were kept at 50° C. (dry) or ambient temperature and humidity. Table 11 shows results of experiments which demonstrate this effect.

TABLE 11

| Data | Water Vapor Transport At 25° C. (kg/m²/day) | | | |
|---|---|---|---|---|
| 24 h after coating treatment | 2.411 30 sec 25 C. wash | 2.013 3 hr 25 C. wash | 1.656 3 hr 50 C. wash | 4.77 3 hr 25 C. wash |
| 48 h treatment | 8.259 kept at ambient | 8.944 4 hr 50 C. 10% RH | 8.800 kept at ambient | 8.513 kept at ambient |
| 52 h treatment | | 8.55 2 days 50 C. 10% RH | | |
| 120 h treatment | 8.511 | 8.406 2 days ambient | 8.699 | 8.322 2 days 50 C. 10% RH |
| 192 h | | 7.92 Ambient | | 8.469 Ambient |

TABLE 11-continued

| Data | Water Vapor Transport At 25° C. (kg/m²/day) | |
| --- | --- | --- |
| 240 h | 8.636 | 8.593 |
| 264 h |  | 8.836 |

Samples maintained performance after hydration, provided the time between casting and hydrating the sample was at least 24 hours. Table 12 shows results of experiments which demonstrate this effect.

Increasing cross-linking to a high level may lead to slightly lower water vapor transport performance due to constraining of molecular movement. Table 14 shows results of experiments which demonstrate this effect. The degree of cross-linking does not have a strong effect on the performance of the membranes. In this table, Permax™ 230 at different coating thickness and levels of Stahl™ XL-702 cross-linker are coated on a dry stretch PP substrate. Water vapor flux performance is shown at different temperatures, cross-linking has a slight effect on water vapor transport at high levels, but overall the effect of coating thickness is more pronounced.

TABLE 14

| Sample | XL (%) | Coat Weight (g/m²) | Coating Thickness (μm) | Water Vapor Transport (kg/m²/day) | | | | | |
| --- | --- | --- | --- | --- | --- | --- | --- | --- | --- |
| | | | | As Cast | | | Rehydrated | | |
| | | | | 25° C. | 35° C. | 50° C. | 25° C. | 35° C. | 50° C. |
| PP-PEO-PU-15 | 15 | 3.9 | 3.6 | 0.4 | 1.3 | 19.0 | 5.1 | 8.1 | 22.9 |
| | | 2.6 | 2.4 | 0.4 | 1.3 | 25.3 | 6.2 | 9.4 | 26.2 |
| | | 2.5 | 2.3 | 0.8 | 1.9 | 21.5 | 6.1 | 11.1 | 25.7 |
| | | 1.5 | 1.4 | 0.9 | 2.3 | 30.5 | 7.2 | 13.0 | 30.7 |
| | | 0.9 | 0.8 | 3.1 | 6.0 | 31.0 | 7.9 | 14.2 | 33.6 |
| PP-PEO-PU-6 | 6 | 4.0 | 3.7 | 1.2 | 2.8 | 13.9 | 5.2 | 9.3 | 22.0 |
| | | 3.0 | 2.8 | 0.3 | 1.1 | 24.0 | 6.0 | 10.2 | 25.7 |
| | | 2.7 | 2.5 | 0.4 | 1.1 | 17.6 | 6.3 | 10.9 | 26.5 |
| | | 1.4 | 1.3 | 0.7 | 2.0 | 27.4 | 7.6 | 13.8 | 32.0 |
| | | 0.9 | 0.9 | 2.0 | 4.5 | 33.5 | 8.5 | 14.8 | 34.7 |
| PP-PEO-PU-0 | 0 | 4.0 | 3.6 | 0.2 | 0.9 | 14.3 | 5.3 | 9.2 | 22.5 |
| | | 2.9 | 2.7 | 0.5 | 1.7 | 12.5 | 6.0 | 10.7 | 25.4 |
| | | 2.6 | 2.4 | 0.6 | 1.7 | 21.7 | 6.3 | 11.7 | 26.8 |
| | | 1.5 | 1.4 | 0.9 | 2.6 | 31.5 | 7.5 | 13.6 | 31.7 |
| | | 0.9 | 0.9 | 2.8 | 6.1 | 32.2 | 8.1 | 14.7 | 34.0 |
| | | 0.7 | 0.7 | 5.1 | 9.6 | 35.1 | 8.5 | 15.4 | 35.8 |

TABLE 12

| Time Between Casting and Hydration (h) | Water Vapor Transport at 25° C. (kg/m2/day) | |
| --- | --- | --- |
| | Initial Performance | Final Performance (After 7 Days) |
| 0 | 6.4 | 3.0 |
| 2 | 6.5 | 5.3 |
| 18 | 6.1 | 5.0 |
| 42 | 6.3 | 6.4 |
| 66 | 6.4 | 6.5 |
| 90 | 6.6 | 6.6 |
| 114 | 6.6 | 6.6 |

Adding water to the samples appears to plasticize the polymer as the soft segment Tg is lowered from −51.5° C. to −67.7° C. Table 13 shows results of experiments which demonstrate this effect. At temperatures between 0° C. and 60° C., no PEO melting was observed for the hydrated samples.

TABLE 13

| Sample | XL (%) | Thickness (μm) | Hydration Time (s) | Water Uptake (%) | Tg(s) | |
| --- | --- | --- | --- | --- | --- | --- |
| | | | | | Dry | Wet |
| 0 | 0 | 576 | 300 | 40.5 | −51.5 | −67.7 |
| 1:15 | 6.7 | 378 | 150 | 36.8 | −51.5 | −65.7 |
| 1:5 | 16.7 | 290 | 150 | 36.7 | −52.5 | −64.0 |

Plasticizer Blending

Adding a plasticizer to the active layer results in some improvement of water vapor permeability at high loading of the plasticizer. However, performance still decreases over time. Table 15 shows results of experiments which demonstrate this effect. Here samples with different levels of polyethylene glycol (PEG200) were added the PEO-PU+7% XL coating prior to coating on the PP substrate to test the effect of plasticizer. Overall the addition of PEG200 increases the performance of the membranes. However PEO crystallization still occurs over time.

TABLE 15

| PEG-200 in the coating (%) | Film Permeability, 25° C. Water Vapor Transport, (kg/m²/day) | | |
| --- | --- | --- | --- |
| | Day 1 | Day 2 | Day 48 |
| 5 | 2.8 | 1.8 | — |
| 10 | 4.5 | 3.2 | — |
| 15 | 6.2 | 5.6 | — |
| 20 | 8.8 | 4.0 | 3.3 |
| 30 | 9.4 | 5.2 | 4.1 |

Nanoparticle Addition

In membranes that included silica ($SiO_2$), titanium oxide ($TiO_2$) and alumina ($Al_2O_3$) nanoparticles added to the coating in 5 or 10% by weight the water vapor permeability showed a decrease over time. These oxide particles were obtained from Evonik™ under the brand names Aerosil™ and Aeroxide™. This decrease was not as significant as the decrease in similar membranes which lacked the added nanoparticles. Table 16 shows results of experiments which demonstrate this effect. Here microporous PP substrates were coated with a polymer (PEO-PU with a cross-linker). Different loadings of additive particles of titanium, silica, and alumina were incorporated into the polymer. Performance decay is still evident although somewhat reduced in comparison to similar samples without the additive particles.

TABLE 16

| Additive | Loading (%) | Coat Weight | Water Vapor Transport (kg/m²/day) | | |
|---|---|---|---|---|---|
| | | | As Cast | 24 h | 72 h |
| $TiO_2$ | 5 | 1.14 | 8.8 | 5.0 | 5.1 |
| $TiO_2$ | 10 | 1.22 | 8.5 | 5.5 | 5.7 |
| $SiO_2$ | 5 | 1.09 | 8.3 | 2.9 | 4.0 |
| $SiO_2$ | 10 | 1.17 | 8.5 | 3.7 | 4.6 |
| $Al_2O_3$ | 5 | 1.20 | 8.9 | 3.4 | 4.4 |
| $Al_2O_3$ | 10 | 1.03 | 8.7 | 3.6 | 4.7 |

Effects of Temperature

Figure 8:
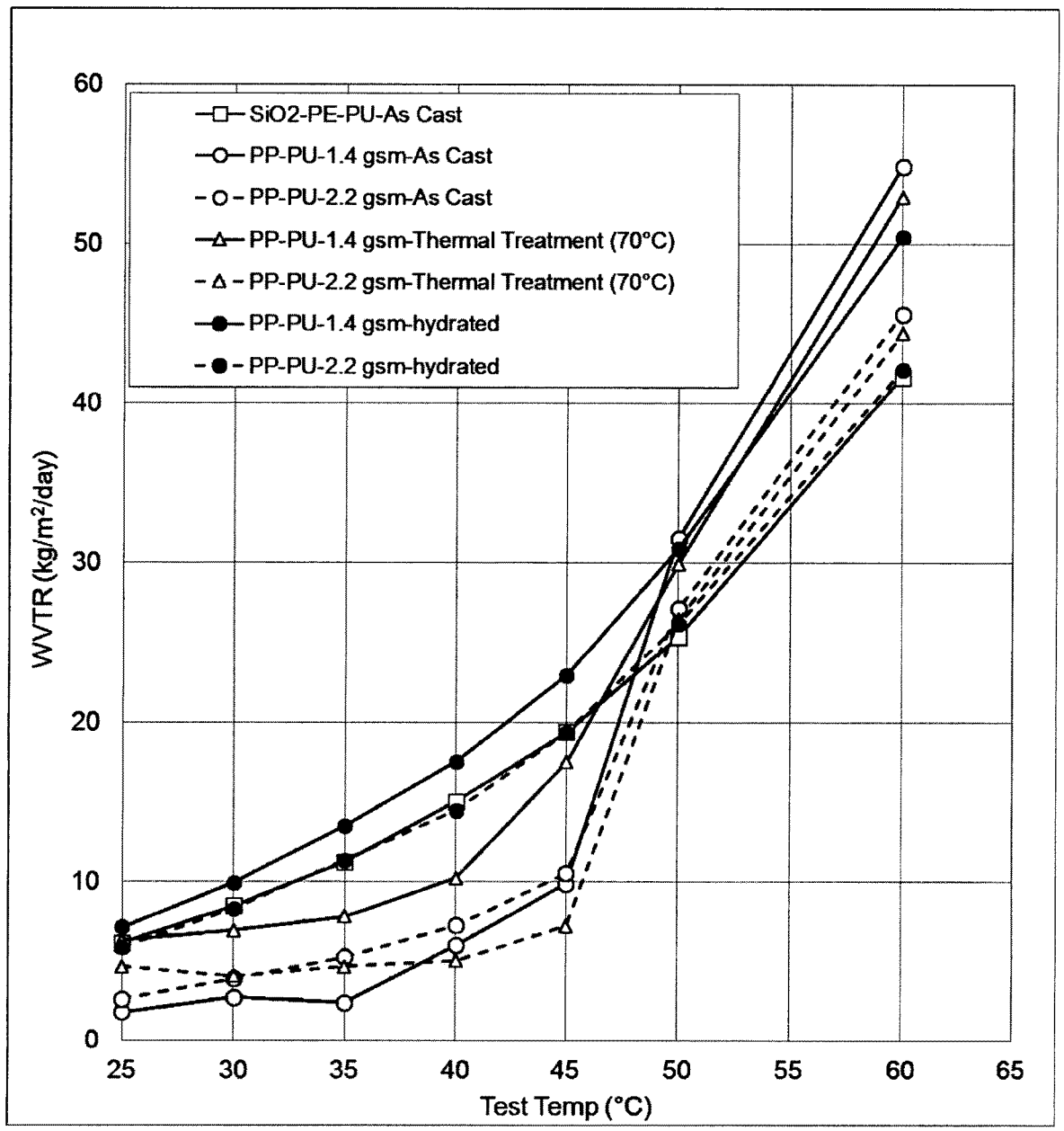
FIG. 8 is a graph showing water vapor transport flux in the membrane as a function of temperature for various example embodiments and a control sample on a silica-loaded polyethylene substrate.

Increasing temperature increases WVT performance in general associated with the higher vapor pressure differential. This is illustrated in FIG. 8. A clear step change in permeability is observed between 45° C. and 50° C. for samples as cast and room temperature conditioned on the dry stretch (PP) substrates. This occurs for low and high coat weights as reported in gsm (grams per square meter) which is directly related to thickness.

Conditioning at 70° C. for 12 h and then quickly cooling to room temperature appears to increase the water vapor permeability slightly and appears to have a different effect for thicker coatings compared to thinner coatings. A step change in permeability over increasing temperature still occurs though, and is particularly strong in the sample having a thicker coating.

Rehydrating both samples on the PP substrate (low and high thickness) increases the WVT to an expected level and the step change in permeability with increasing temperature is eliminated.

Membranes made by coating the silica-PE substrate have no step change in transport, indicating that substantially no PEO crystallization occurs in such samples.

Thermal Analysis of PEO-PU Membranes

Figure 9:
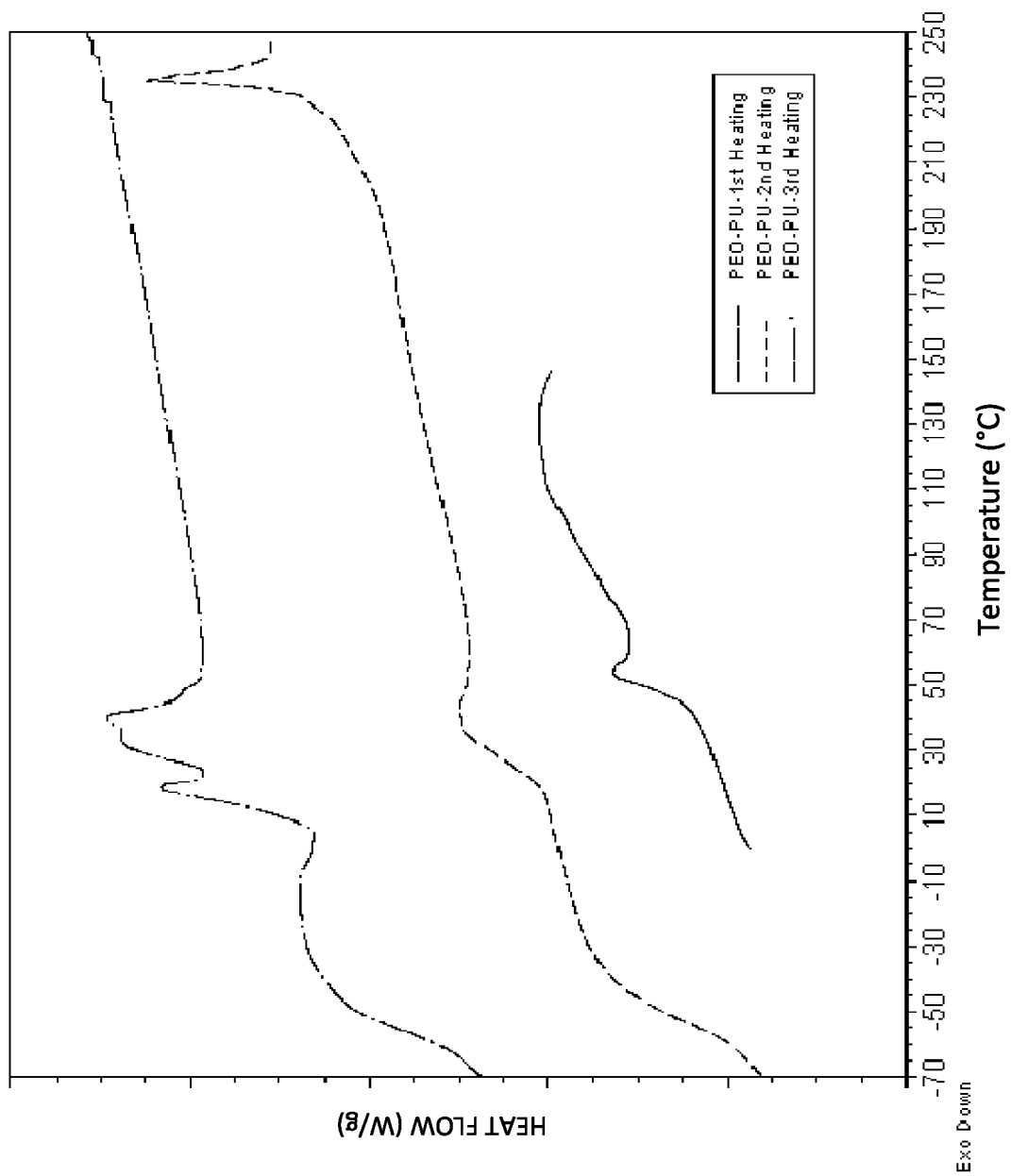
FIG. 9 is a curve showing results of differential scanning calorimetry for a sample polymer according to an example embodiment.

Samples of the Permax™ 230 polymer were exposed to thermal analysis. Three heating cycles are shown in FIG. 9. In the first heating of the as cast samples, a melting peak associated with crystalized PEO segments was found at ~50° C. The endotherm had an area of 2.0 J/g of polymer. The sample was heated to 150° C. and a broader endothermic peak was observed, which is associated with loss of residual water. After cooling to −80° C., the second heating cycle was run. During the second heating cycle, a PEO glass transition was observed at approximately −50° C., and then a broader melting endotherm associated with PEO crystalline melting was observed at approximately 40° C. The endotherm had an area of 4.2 J/g of polymer. Melting of the hard segments of the urethane began at around 205° C., and peaked at 235° C. The endotherm had an area of 4.1 J/g of polymer. After melting, very little crystallization was observed in the polymer upon cooling. Looking at a subsequent third heating cycle in FIG. 9 it can be observed that the Tg of the soft segment of the polymer was intact but was slightly shifted to lower temperature. A complex series of endothermic peaks were observed between 5 and 50° C., with a total area of 10.86 J/g of polymer.

Figure 10:
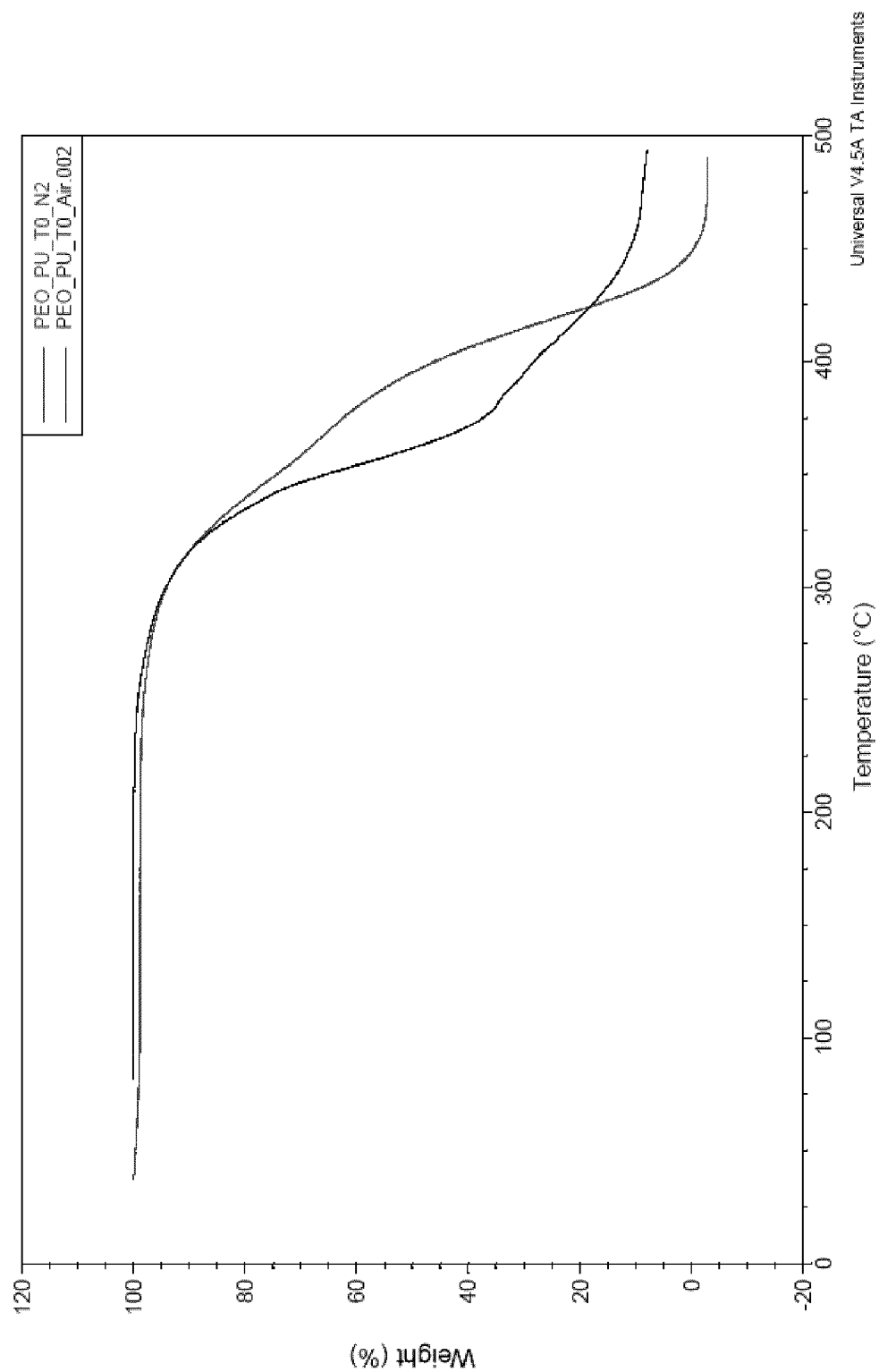
FIG. 10 is a curve showing the decrease in weight of a sample membrane according to an example embodiment as a function of temperature.

The endotherm at ~30° C. is likely associated with melting of soft segments of the PEO-PU copolymer which were able to rearrange after melting of hard segments at 235° C. No major hard segment melting peak is visible up to 250° C. in FIG. 9 which would indicate that the urethane hard segments did not significantly recrystallize after melting, at least at a cooling rate of 10° C./min. TGA's of the polymer in nitrogen and air are shown in FIG. 10, indicating that the polymer is thermally stable to over 250° C. in both environments.

Figure 11:
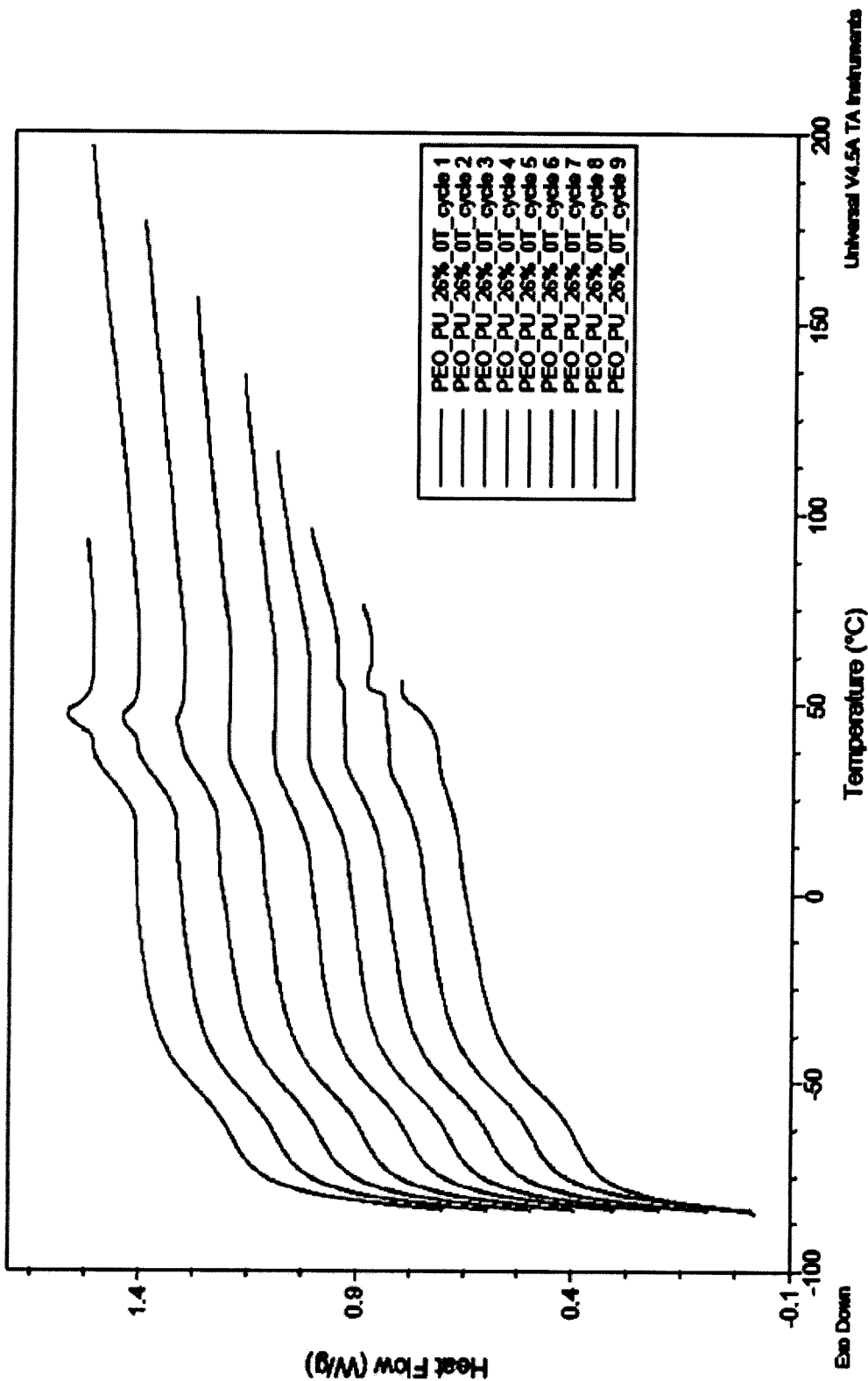
FIG. 11 is a set of curves showing results of repeated thermal cycles for a sample membrane according to an example embodiment.

The effect of thermal history is shown in FIG. 11. The same sample was exposed to multiple heating cycles to subsequently higher maximum temperatures. Initially two apparent thermal events were noted in the first heating cycle, a minor peak at 27.2° C. and a sharper peak at 49.5° C. The transition at 50° C. had an endothermic peak which was likely caused by 'annealing' at room temperature over time. The peak is associated with the melting of crystalline soft segments. After heating over 55° C., the transitions both appeared to shift slightly upward in temperature. This trend continued to the third cycle (after heating to 75° C.), after which the higher transition was eliminated. Similar trends occurred for uncross-linked samples of the polymer. Generally the heat of melting (J/g) (which can be measured by integrating the area under endothermic peaks) increases with each step as the maximum temperature is increased.

After heating to 155° C., a slight endothermic peak arises around 46° C.; this peak becomes larger as the maximum heating temperature increases. It is believed that as the sample is heated closer to the melting temperature of the PU hard segments the polymer becomes sufficiently mobile for the soft segments to rearrange and then crystallize on cooling, leading to a larger complex endotherm around the melting temperature of the soft segments. Table 17 shows results of experiments which demonstrate this effect.

TABLE 17

| | Thermal Transitions | | | |
|---|---|---|---|---|
| Max Temperature (° C.) | Tg, s (° C.) | Tx, 1 (° C.) | Tx, 2 (° C.) | $H_m$ (J/g) |
| 25 | −52 | 27.2 | 49.5 | — |
| 55 | −52.4 | 28.1 | 52.9 | 1.87 |
| 75 | −53.0 | 28.4 | 55.0 | 3.08 |
| 95 | −52.6 | 27.8 | — | 3.51 |
| 115 | −52.3 | 27.5 | — | 3.56 |
| 135 | −53.4 | 27.4 | — | 2.78 |
| 155 | −52.0 | 32.2 | 43.5 | 3.63 |
| 175 | −52.0 | 30.4 | 45.6 | 6.34 |
| 195 | −53.3 | 29.5 | 46.5 | 6.66 |

Figure 12:
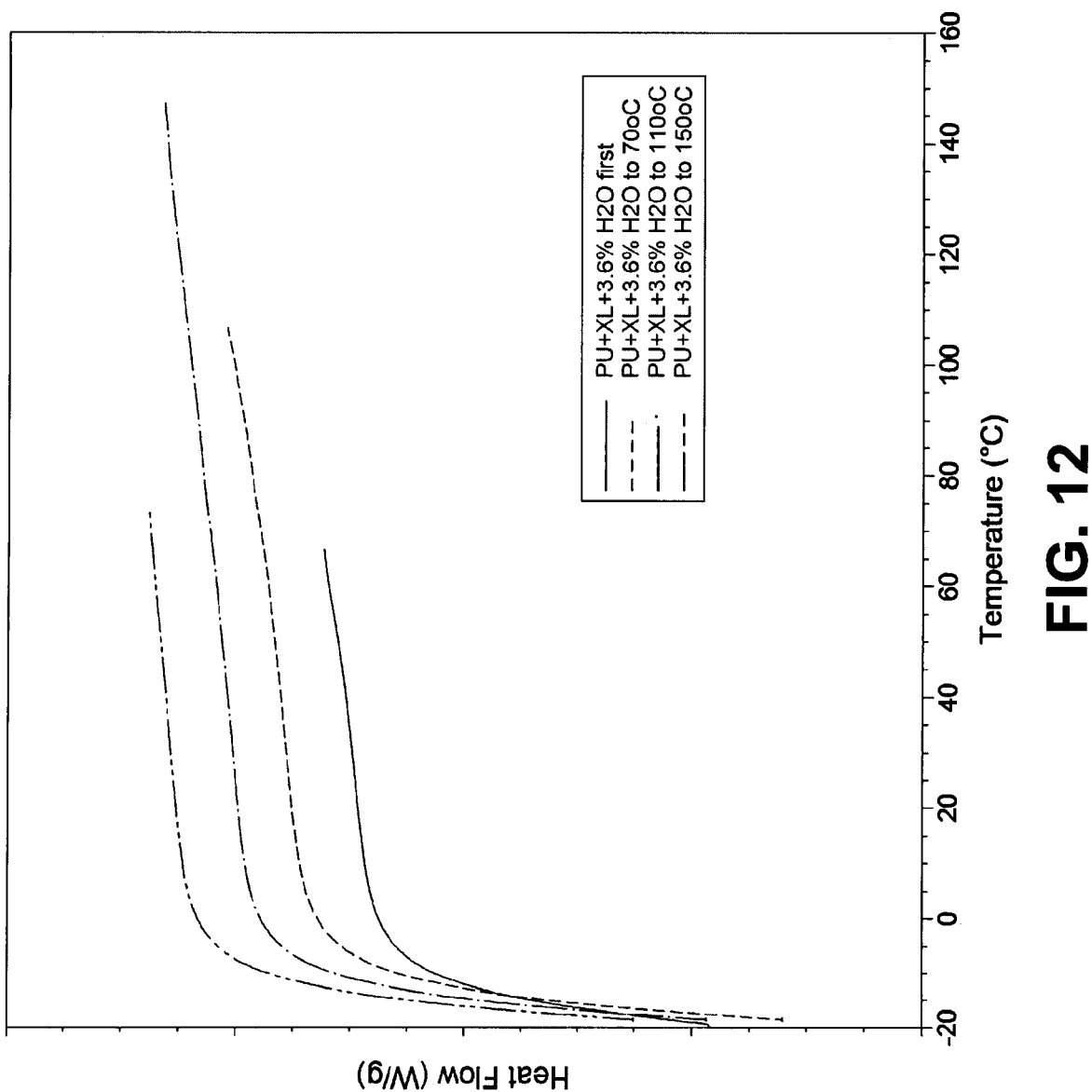
FIG. 12 is a set of curves showing results of repeated thermal cycles for a sample membrane according to an example embodiment.

These transitions were not present after hydrating the cured polymer samples, as shown in FIG. 12.

FTIR Analysis

Figure 13:
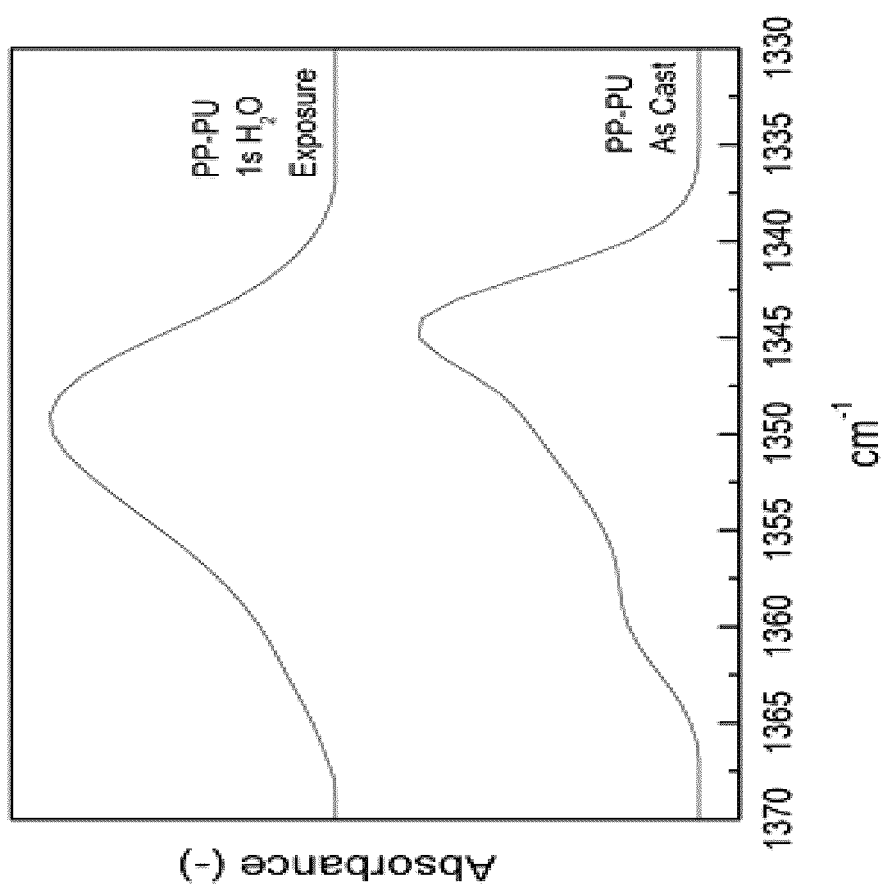
FIG. 13 is a set of curves showing results of Fourier transform infrared spectroscopy for a sample membrane according to an example embodiment as-cast and after exposure to liquid water.

The presence of crystalline PEO can be confirmed by FTIR absorbance scans of the PU coating on various substrates. The crystalline PEO segments have peaks associated with the $CH_2$ groups in the ethylene oxides usually as a doublet at ~1359 and 1343 $cm^{-1}$, the same $CH_2$ groups in amorphous PEO are a broader singlet at 1349 $cm^{-1}$ (see FIG. 13). This provides a good indication the presence of crystallinity in the PEO segments of the polymer coating. Table 18 provides a summary of IR peaks associated with crystalline and amorphous PEO. These samples were either dry stretch PP or silica-PE substrates coated with various coatings comprising Permax™ 230 with XL-702 cross-linker. FTIR scans were on the coated surface.

TABLE 18

IR peaks associated with crystalline and amorphous PEO

| Peak (cm$^{-1}$) | 1359 | 1343 | 1349 |
|---|---|---|---|
| PEO State | crystalline | | amorphous |
| Designation | CH$_2$ wag, doublet | | CH2 wag, singlet |
| Sample | | | |
| PU-PP-Vacuum and Desiccant | 1360 | 1344 | — |
| PU-PP-Saturated in liquid water | — | — | 1349 |
| PP-PU-As Cast | 1360 | 1344 | — |
| PP-PU-1 s dip H$_2$O | — | — | 1349 |
| PP-PU-5 s dip H$_2$O | — | — | 1349 |
| PP-PU-10 s dip H$_2$O | — | — | 1349 |
| PP-PU-30 s dip H$_2$O | — | — | 1349 |
| PP-PU-30 s dip H$_2$O | — | — | 1349 |
| PP-PU-60 s dip H$_2$O | — | — | 1349 |
| PP-PU-180 s dip H$_2$O | — | — | 1349 |
| PP-PU-360 s dip H$_2$O | — | — | 1349 |
| PP-PU-900 s dip H$_2$O | — | — | 1349 |
| PP-PU-80% RH exposure | 1360 | 1344 | — |
| PP-PU-Acetone dip | 1359 | 1345 | — |
| Silica-PE-PU-6% XL | — | — | 1349 |
| Silica-PE-PU-8% XL | — | — | 1349 |
| Silica-PE-PU-15% XL | — | — | 1349 |
| Silica-PE-PU-10% XL | — | — | 1349 |
| Silica-PE-PU-12% XL | — | — | 1349 |
| Silica-PE-PU-0% XL | — | — | 1349 |
| PEO-PU Polymer Film-6.7% XL | 1359 | 1342 | — |
| PEO-PU Polymer Film-16.7% XL | 1359 | 1342 | — |
| PP-PU-0% XL | 1359 | 1344 | — |
| PP-PU-6% XL | 1359 | 1344 | — |
| PP-PU-12% XL | 1359 | 1344 | — |
| PP-Corona Treated-PU-6% XL | 1359 | 1344 | — |

From the IR scans, it can be clearly observed that the substrate has an impact on the crystallization of the PEO-PU polymer at different levels of cross-linking. With the silica-PE based substrate, the PEO groups are amorphous, and with the PP substrate the silica-PE groups are at least partially crystalline. This aligns with the observed lower permeability performance at 25° C.

The effect of wetting, corona treatment, acetone treatment, and other solvent treatment is also shown in Table 18. The PEO-PU coated PP samples still show some crystalline character in the IR scans after acetone treatment and when the PP substrate was 'corona treated' prior to coating with PEO-PU. Even short (1 second) dip in liquid water however converts substantially all of the PEO polymer to an amorphous state. Samples exposed to 80% RH air still show peaks indicative of crystalline PEO.

Gas Selectivity

A sample membrane was prepared by casting crosslinked PEO-PU on a microporous PP substrate, drying the membrane, and rehydrating the membrane 48 hours after drying with a short exposure to liquid water. The sample membrane was then dried. The water vapor transport of the sample membrane at 25° C. with 50% RH in the feed stream and 0% RH in the sweep stream was 6.8 kg/m$^2$/day. The water vapor permeance was 7600 GPU. The carbon dioxide transport of the sample membrane at 25° C. with 100% CO$_2$ in the feed stream and 100% nitrogen in the sweep stream was 0.46% or 56 GPU. The selectivity of the sample membrane for water vapor transport over carbon dioxide transport was 141.

Methods of Testing

To accurately and consistently coat membranes on a bench-scale, a Mayer rod coater (also known as a Meyer bar, a miter rod, a Meyer rod, a meter bar, a coating rod, an equalizer bar, a doctor rod, and a metering rod coater) was used. A Mayer rod coater comprises steel wire wound tightly around a rod. The space between adjacent wraps of the wire depends on the diameter of the wire used to wrap the rod. In the examples described elsewhere herein, the Mayer rod coater was used to exert a substantially constant downward pressure on top of the substrate. A polymer solution was then deposited by pipette onto the substrate surface in front of the Mayer rod coater. A linear actuator was used to drive the rod across the substrate surface at a constant rate, spreading the polymer solution on the substrate. The thickness of the wet polymer solution deposited on the substrate surface depended on the diameter of the wire used to wrap the rod. In the examples described elsewhere herein, wire diameters ranged from 0.05 mm to 0.3 mm, which allowed for controlled wet film deposits ranging from about 4 microns to about 24 microns in thickness. The coating was allowed to settle by gravity into a film of substantially uniform wet thickness. The material was then dried to remove the solvent and create a coated substrate with a consistent dry coating thickness and coating loading. Further refinement in coating loading may be achieved by altering the solids content, viscosity, density, and surface tension properties of the polymer solution used to coat the substrate. For roll-to-roll processes, a slot die or reverse gravure coating method is preferred.

To assess the air permeation or air crossover properties of the sample membranes described elsewhere herein, the sample membranes were sealed in a test apparatus. Pressurized air was applied to one side of the membrane and air flow through the material was recorded. In a typical test, pressurized air was applied at 3 psi or 20.7 kPa. The crossover flow rate through the sample membranes was recorded in cubic centimeters per minute (cm$^3$/min). Crossover flow rate can be converted to an air permeation value by dividing the applied pressure and the membrane area (45 cm$^2$ in a typical test). Air permeation can be reported in cm$^3$/min/cm$^2$/kPa. Unless reported otherwise, the sample membranes described elsewhere herein had an air crossover of zero, indicating that there were substantially no defects in the coating layer of the membranes.

The exhaust air transfer ratio (EATR) provides an indication of the amount of contaminant gas that may pass through a membrane. Preferably, this value is less than 5%, and more preferably this value is less than 1%. Most preferably, there is 0% contaminant gas transport through the membranes described elsewhere herein. A test was developed to determine the EATR of the sample membranes described elsewhere herein. In this test, a membrane sample was placed in a test apparatus which separates the two sides of the membrane so that independent gas streams may be provided on opposing sides of the membrane. The apparatus had an area of 33 cm$^2$ in which gas flow was directed over opposing sides of the membrane in a counter-flow orientation. Gases flowed through 7 channels, each about 16 cm in length, 1 mm in depth, and 3 mm in width. A pure nitrogen gas stream was passed over one side of the membrane and an air stream was passed over the other side of the membrane. The flow rate of the gases over each side of the membrane was equal in any given test. Transport was measured at two flow rates for each sample: 2000 cm$^3$/min (about 1.6 m/s) and 500 cm$^3$/min (about 0.4 m/s). At the lower flow, the residence time of gases flowing over the membrane surfaces in the module is longer and higher transport rates were measured. The transport of oxygen and nitrogen is a measure of defects in the coating layer. Membranes having a coating with substantially no defects should have zero EATR at both 2000 cm³/min and 500 cm³/min flow rates. The differential pressure between the two streams was maintained at zero so that only diffusive transport and not convective transport occurs through the membrane. An oxygen sensor was placed at the outlet of the nitrogen stream to measure the oxygen concentration. Since the concentration of oxygen in air is known, and the nitrogen stream contained no oxygen at the inlet, the percentage of oxygen passing through the membrane by diffusion can be reported as:

EATR %={[C(O$_2$,1)]/[C(O$_2$,2)]}×100 where C refers to the percent concentration of oxygen (O$_2$) at points 1 and 2, with point 1 being at the nitrogen-side outlet (measured by the sensor) and point 2 being at the air-side inlet (measured at 20.9%). And:

EATR %={[C(O$_2$,2)]/[C(O$_2$,3)]}×100 where C refers to the percent concentration of oxygen (O$_2$) at points 2 and 3, in counter-flow test module, with point 2 being at the nitrogen-side outlet (measured by the sensor) and point 3 being at the air-side inlet (measured at 20.9%).

The test is completed at a series of flow rates and the oxygen flux is calculated from these results as:

$$J_{O_2} = \frac{\dot{Q}_2 p_{O2,3} V_m \gamma}{RTA}$$

Subsequently permeance is calculated using the partial pressure difference of oxygen across the membrane:

$$P_{O_2} = \frac{J_{O_2}}{p_{O2,3} - p_{O2,2}}$$

Permeance is reported in gas permeance units (GPU) where 1 GPU=1×10⁻⁶ cm³ (STP) cm⁻² s⁻¹ cmHg⁻¹.

Similar to oxygen/nitrogen permeance measurements above, carbon dioxide transport can also be determined. Carbon dioxide transport is measured with one side of the membrane exposed to pure carbon dioxide and the other side to pure nitrogen. Carbon dioxide is measured at the sweep outlet by a carbon dioxide probe (Vaisala™ GMT220). Carbon dioxide permeance in GPU through the membrane is calculated in the same way as oxygen permeance.

A dynamic water vapor transport rate (WVTR) testing procedure was developed which was designed to test the membranes under conditions which are similar to those in which they might be used. The test apparatus used is similar to that described as a dynamic moisture permeation test by P. Gibon, C. Kendrick, D. Rivin, L. Sicuranza, and M. Charmchi, "An Auomated Water Vapor Diffusion Test Method for Fabrics, Laminates, and Films," Journal of Industrial Textiles, vol. 24, no. 4, pp. 332-345, April 1995 and also summarized in ASTM E298 and specifically ASTM F2298. A membrane sample was sealed in a test apparatus with flow field pathways on both sides of the membrane to evenly distribute gases over both surfaces of the sample, the gases being separated by the membrane. The flow rate, temperature, and RH of each inlet gas stream were controlled and the outlet temperatures and RH of each gas stream were measured. The gases were supplied and directed in counter-flow over the opposing surfaces of the membrane. The membrane active area in the test apparatus was 33 cm³. In a typical isothermal test, a first gas stream (sweep stream) was supplied at 25° C. and 0% RH to the inlet on one side of the membrane at 6000 cm³/min (about 0.8 m/s). A second gas stream (the feed stream) was supplied to the inlet on the other side of the membrane at 25° C. and 50% RH at 6000 cm³/min (about 0.8 m/s). The water content and temperature of the two gas streams were measured and recorded at the outlets. From these values, the water transport rate of the test sample was determined in units of mass per time (g/h). The results may also be reported as a water flux by dividing by the membrane area over which the transport occurred in units of mass per area per time (kg/m²/h or mol/m²/s). By dividing flux by the calculated mean vapor pressure differential across the membrane within the test module, a permeance value was determined in units of mass per area per time per vapor partial pressure differential (mol/m²/s/Pa). Permeance is typically reported in GPU. Permeance is reported as an apparent permeance without accounting for concentration boundary layers associated with water vapor at the membrane surfaces. Due to the scale of the results it was found most convenient to report water transport data as a water flux value in units kg/m²/day. For tests where the temperature and RH were not at the standard test conditions (feed stream at 25° C. and 50% RH), the temperature and humidity are reported. In some tests, water vapor transport was measured with the feed stream at 50° C. and 50% RH. In order to determine the film layer permeability, the substrate and boundary layer water vapor transport resistances had to be determined. This could be achieved using a resistance in series model, which proposes that the resistances to vapor transport in the test module and through the membrane are additive, wherein the resistance is the inverse of conductivity:

$$R_i = \frac{1}{k_i}$$

And generally for the present system:

$$\frac{1}{k_{obs}} = \frac{1}{k_{bl,f}} + \frac{1}{k_{mem}} + \frac{1}{k_{bl,s}}$$

Where $k_{bl,f}$ and $k_{bl,s}$ are the mass transfer coefficients associated with the boundary layers on the feed and sweep sides of the membrane, respectively. For a microporous substrate with a dense selective polymeric film layer on one surface, the total resistance to water vapor transport is the sum of the resistance of the substrate and the resistance of the coating:

$R_{mem} = R_{film} + R_{sub}$

For the total system the observed resistance ($R_{obs}$) is:

$R_{obs} = R_{bl} + R_{mem} = R_{bl,f} + R_{film} + R_{sub} + R_{bl,s}$

The mass transfer coefficient in the coating film layer is defined using the solution-diffusion model. The mass transport coefficient is the permeance or the thickness normalized permeability:

$$k_{film} = \frac{P}{l_{film}}$$

The observed resistance of water vapor transport in s/m was determined from the experimental results. In order to determine the contribution of the substrate and boundary layers, the microporous substrate was tested on its own at the same conditions. The film layer resistance was then determined from resistance equation, and the film layer permeability was reported as the thickness normalized and vapor pressure differential normalized flux across the film, in Barrer units. The conversion of the Barrer units from SI is:

$$\frac{\text{mol} \cdot \text{m}}{\text{m}^2 \cdot \text{s} \cdot \text{Pa}} \times 2.989 \times 10^{15} = 1$$

$$\text{Barrer} = 1 \times 10^{-10} \frac{\text{cm}^3(STP) \cdot \text{cm}}{\text{cm}^2 \cdot \text{s} \cdot \text{cmHg}}.$$

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

"approximately" when applied to a numerical value means±7%.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a substrate, assembly, device, manifold, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments described herein.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

ENUMERATED EXAMPLE EMBODIMENTS

The following enumerated example embodiments provide examples of features and feature combinations that make up non-limiting example embodiments of the invention.

1. A water vapor transport membrane comprising a microporous polymeric substrate and an air-impermeable active layer coated on a surface of the substrate, wherein the active layer comprises a polyurethane (PU) copolymer and a polar protic solvent in an amount of about 3% to about 100% of copolymer weight in the active layer wherein molecules of the polar protic solvent are bonded to the PU copolymer.

2. A water vapor transport membrane comprising a microporous polymeric substrate and an air-impermeable active layer coated on a surface of the substrate, wherein the active layer comprises a polyethylene-oxide-containing (PEO-containing) copolymer and a polar protic solvent in an amount of about 3% to about 100% of copolymer weight in the active layer wherein molecules of the polar protic solvent are bonded to the copolymer.

3. A water vapor transport membrane comprising a microporous polymeric substrate and an air-impermeable active layer coated on a surface of the substrate, wherein the active layer comprises a PEO-containing copolymer and a polar protic solvent wherein molecules of the polar protic solvent are bonded to ethylene oxide groups of the PEO-containing copolymer wherein the active layer comprises polar protic solvent in an amount such that there are in the range of about 0.1 to about 2 molecules of the polar protic solvent bonded to the PEO-containing copolymer per ethylene oxide group in the PEO-containing copolymer.

4. A water vapor transport membrane comprising:
   a microporous polymeric flame retardant substrate, the substrate having a porosity of at least 30%, a thickness of less than 75 microns and having an inorganic solids content of less than 3%; and
   an active layer on a face of the substrate, the active layer comprising a cross-linked polyethylene-oxide-containing (PEO-containing) polyethylene-polyurethane copolymer and a polar protic solvent having one or more hydroxyl groups wherein molecules of the polar protic solvent are bonded to ethylene oxide groups of the PEO-containing copolymer wherein the active layer comprises polar protic solvent in an amount such that there are in the range of about 0.1 to about 2 molecules of the polar protic solvent bonded to the PEO-containing copolymer per ethylene oxide group in the PEO-containing copolymer the active layer being air-impermeable and water insoluble and having a thickness of 10 microns or less;

the membrane characterized by a permeability to water vapor of at least 2000 Barrer units over a temperature range spanning at least −5° C. to 40° C. and a selectivity ratio for water vapor over carbon dioxide of at least 50.

5. A water vapor transport membrane comprising a microporous polymeric substrate and an air-impermeable active layer coated on a surface of the substrate, wherein a water vapor permeability of the membrane is at least 2000 Barrer units over a temperature range of about −5° C. to about 60° C.

6. A water vapor transport membrane comprising a microporous polymeric substrate and an air-impermeable active layer coated on a surface of the substrate, wherein the active layer is stabilized by bonding molecules of a polar protic solvent to the active layer such that a water vapor permeability of the membrane remains at least 90% of a water vapor permeability of the membrane as cast for a period of at least 7 days.

7. A water vapor transport membrane according to any of the above example embodiments, wherein the polar protic solvent comprises one or more of water, methanol, ethanol, and isopropyl alcohol.

8. A water vapor transport membrane according to example embodiment 7, wherein the polar protic solvent comprises water.

9. A water vapor transport membrane according to example embodiment 8, wherein the copolymer comprises ethylene oxide groups and the active layer comprises in the range of about 0.1 to about 2 molecules of water bonded to the copolymer per ethylene oxide group in the copolymer.

10. A water vapor transport membrane according to example embodiment 9 wherein the copolymer comprises side chains, the side chains are characterized by melting temperatures and, at a temperature below the melting temperatures of most of the side chains, the membrane has a water vapor permeability of at least 30000 Barrer units.

11. A water vapor transport membrane according to example embodiment 9, wherein the active layer comprises about 0.1 to 1.1 molecules of water bonded to the copolymer per ethylene oxide group in the copolymer.

12. A water vapor transport membrane according to example embodiment 9, wherein the active layer comprises the polar protic solvent in an amount of about 3% to about 10% or 3% to about 30% of copolymer weight in the active layer.

13. A water vapor transport membrane according to example embodiment 12, wherein the active layer comprises about 0.1 to about 0.4 molecules of water bonded to the copolymer per ethylene oxide group in the copolymer.

14. A water vapor transport membrane according to any of the above example embodiments, wherein the membrane has a permeability to water vapor of at least 20000 Barrer units.

15. A water vapor transport membrane according to example embodiment 14, wherein the permeability of the membrane to water vapor is at least 2000 Barrer units over a temperature range of about −25° C. to about 60° C.

16. A water vapor transport membrane according to any of the above example embodiments, wherein the material of the active layer has a Fourier transform infrared spectroscopy (FTIR) peak at about 1349 $cm^{-1}$.

17. A water vapor transport membrane comprising a microporous polymeric substrate and an air impermeable active layer coated on a surface of the substrate, wherein the active layer comprises a PU copolymer having side chains and/or main chains that crystallize below a transition temperature.

18. A water vapor transport membrane according to example embodiment 17, wherein the membrane has a first permeability to water vapor at temperatures above the transition temperature and a second permeability to water vapor at temperatures below the transition temperature, and wherein the first permeability is greater than the second permeability.

19. A water vapor transport membrane according to example embodiment 18, wherein the first permeability is at least three times greater than the second permeability.

20. A water vapor transport membrane according to example embodiment 18, wherein the first permeability is at least seven times greater than the second permeability.

21. A water vapor transport membrane according to any one of example embodiments 17 to 20, wherein the membrane comprises FTIR peaks at about 1359 $cm^{-1}$ and 1343 $cm^{-1}$ at temperatures below the transition temperature.

22. A water vapor transport membrane according to any one of example embodiments 17 to 21, wherein the membrane comprises a FTIR peak at about 1349 $cm^{-1}$ at temperatures above the transition temperature.

23. A water vapor transport membrane according to any of the above example embodiments, wherein the substrate is a microporous polyolefin.

24. A water vapor transport membrane according to example embodiment 23, wherein the polyolefin is uni-axially or bi-axially stretched.

25. A water vapor transport membrane according to example embodiment 23, wherein the polyolefin is dry-processed.

26. A water vapor transport membrane according to example embodiment 23, wherein the polyolefin is wet-processed.

27. A water vapor transport membrane according to any one of example embodiments 23 to 26, wherein the polyolefin comprises PE or PP.

28. A water vapor transport membrane according to example embodiment 23, wherein the substrate comprises a dry-stretched PP battery separator.

29. A water vapor transport membrane according to any of the above example embodiments, wherein the porosity of the substrate is at least about 25% or at least 30% or at least 40%.

30. A water vapor transport membrane according to any of the above example embodiments, wherein the substrate has a thickness of less than about 150 microns or less than about 50 microns or less than about 35 microns.

31. A water vapor transport membrane according to any of the above example embodiments, wherein the substrate has an average pore area of at least 15000 $nm^2$.

32. A water vapor transport membrane according to any of the above example embodiments, wherein the substrate is flame retardant.

33. A water vapor transport membrane according to any of the above example embodiments, wherein the substrate is hydrophobic.

34. A water vapor transport membrane according to any of the above example embodiments, wherein the copolymer comprises a polyether-PU copolymer.

35. A water vapor transport membrane according to any of the above example embodiments, wherein the copolymer comprises TPU.

36. A water vapor transport membrane according to example embodiment 35, wherein the TPU comprises polyols and one or more of poly-isocyanates and di-isocyanates.

37. A water vapor transport membrane according to example embodiment 36, wherein the di-isocyanates comprise one or more of aliphatic di-isocyanates and aromatic di-isocyanates.
38. A water vapor transport membrane according to example embodiment 36, wherein the di-isocyanates comprise one or more of TDI, MDI, HMDI, and IPDI.
39. A water vapor transport membrane according to any one of example embodiments 36 to 38, wherein the polyols comprise glycols.
40. A water vapor transport membrane according to example embodiment 39, wherein the glycols comprise one or more of PEG and PPG.
41. A water vapor transport membrane according to any one of example embodiments 36 to 38, wherein the polyols comprise one or more of polyether diols and polyester diols.
42. A water vapor transport membrane according to any one of example embodiments 36 to 41, wherein the polyols comprise one or more of short chain diols and long chain polyols.
43. A water vapor transport membrane according to example embodiment 42, wherein the TPU comprises hard segments including isocyanate groups connected by the short chain diols and soft segments including the long chain polyols.
44. A water vapor transport membrane according to example embodiment 43, wherein the TPU comprises soft segments in an amount of about 40% to about 80% of copolymer weight in the active layer.
45. A water vapor transport membrane according to any of the above example embodiments, wherein the copolymer comprises side chains in an amount of about 10% to about 50% of copolymer weight in the active layer.
46. A water vapor transport membrane according to any of the above example embodiments, wherein the copolymer comprises side chains and the side chains comprise one or more of PEO, PCL, and PTMG.
47. A water vapor transport membrane according to example embodiment 46 wherein the PEO side chains have a molecular weight in the range of about 200 Daltons to about 10000 Daltons.
48. A water vapor transport membrane according to any of the above example embodiments wherein the copolymer comprises side chains and the side chains each have a melting point temperature that is below the transition temperature.
49. A water vapor transport membrane according to any of the above example embodiments, wherein the copolymer comprises side chains and at least 50% of the side chains each have a melting point temperature in the range of about −15° C. to about 50° C.
50. A water vapor transport membrane to any of the above example embodiments wherein the copolymer comprises at least one type of main chain.
51. A water vapor transport membrane according to example embodiment 50, wherein the at least one type of main chain comprises PEO.
52. A water vapor transport membrane according to any one of example embodiments 50 or 51, wherein the at least one type of main chain is cross-linked with a cross-linker.
53. A water vapor transport membrane according to example embodiment 51, wherein the cross-linker comprises about 0% to about 16% or about 5% to about 12% of copolymer weight in the active layer.
54. A water vapor transport membrane according example embodiment 51 or 52, wherein the cross-linker comprises one or more of isocyanates, carbodiimides, aziridines, and aqueous polycarbodiimide dispersions.
55. A water vapor transport membrane according to any of the above example embodiments, wherein the active layer is formulated from a coating solution or dispersion, the coating solution or dispersion comprising a solids content of the copolymer in the range of about 20% to about 40% by weight.
56. A water vapor transport membrane according to any of the above example embodiments, wherein a coating loading of the active layer on the substrate is in the range of about 0.8 g/m$^2$ to about 1.4 g/m$^2$.
57. A water vapor transport membrane according to any of the above example embodiments, wherein the thickness of the active layer is about 0.5 microns to about 10 microns.
58. A water vapor transport membrane according to any of the above example embodiments wherein the active layer forms a substantially continuous and dense film on a first surface of the substrate.
59. A water vapor transport membrane according to any of the above example embodiments wherein the active layer forms a substantially continuous and dense film on a second surface of the substrate.
60. A water vapor transport membrane according to any of the above example embodiments, wherein the membrane is selective for water vapor transport.
61. A water vapor transport membrane according to any of the above example embodiments, wherein the membrane is more permeable to water vapor than it is to VOCs.
62. A water vapor transport membrane according to any of the above example embodiments, wherein the surface of the substrate is substantially free of materials that inhibit crystallization of the side chains and/or the main chains of the copolymer.
63. A water vapor transport membrane according to any of the above example embodiments wherein the surface of the substrate is substantially free of $SiO_2$ and $TiO_2$.
64. A water vapor transport membrane according to any of the above example embodiments wherein the substrate is substantially free of materials that inhibit crystallization of the side chains and/or the main chains of the copolymer.
65. A water vapor transport membrane according to any of the above example embodiments wherein the substrate is substantially free of $SiO_2$ and $TiO_2$.
66. An ERV core comprising a pleated membrane cartridge, the membrane cartridge comprising alternating layers of water vapor transport membranes according to any of the above example embodiments with gas flow pathways in between adjacent membrane layers.
67. An ERV system comprising an ERV core comprising a pleated membrane cartridge, the membrane cartridge comprising alternating layers of water vapor transport membranes according to any one of example embodiments 1 to 65 with gas flow pathways in between adjacent membrane layers.
68. A method for making a water vapor transport membrane, the method comprising:
    applying a polyurethane dispersion (PUD) to a microporous polymeric substrate;
    allowing the PUD to dry and cure for a curing period to form an active layer on the substrate;
    after the curing period contacting the active layer with a polar protic solvent and allowing the active layer to take up and retain molecules of the polar protic solvent;
    drying the active layer.

69. A method for making a water vapor transport membrane, the method comprising:
applying a polymer coating to a microporous polymeric substrate, the polymer coating comprising a polyethylene-oxide-containing (PEO-containing) copolymer;
allowing the polymer coating to dry and cure for a curing period to form an active layer on the substrate;
after the curing period contacting the active layer with a polar protic solvent and allowing the active layer to take up and retain molecules of the polar protic solvent;
drying the active layer.

70. A method for making a water vapor transport membrane, the method comprising:
applying a polymer dispersion (PD) to a microporous polymeric substrate, the polymer coating comprising a polyethylene-oxide-containing (PEO-containing) copolymer;
allowing the polymer coating to dry and cure for a curing period to form an active layer on the substrate;
after the curing period contacting the active layer with a polar protic solvent and allowing the active layer to take up and retain molecules of the polar protic solvent;
drying the active layer.

71. A method for making a water vapor transport membrane, the method comprising:
applying a polymer coating to a microporous polymeric flame retardant substrate, the substrate having a porosity of at least 30%, a thickness of less than 75 microns and having an inorganic solids content of less than 3%, the polymer coating comprising a polyethylene-oxide-containing (PEO-containing) polyethylene-polyurethane copolymer and a crosslinker;
allowing the polymer coating to dry and cure for a curing period of at least 24 hours to form an active layer on the substrate, the active layer being air-impermeable and water insoluble and having a thickness of 10 microns or less;
after the curing period contacting the active layer with a liquid polar protic solvent comprising molecules having one or more hydroxyls groups and allowing the active layer to take up and retain molecules of the polar protic solvent such that the molecules of the polar protic solvent are bonded directly to groups in the copolymer;
drying the active layer to provide a membrane that, in a temperature range spanning at least $-5°$ C. to $40°$ C., has a permeability to water vapor of at least 20000 Barrer units and a selectivity ratio for water vapor over carbon dioxide of at least 50.

72. A method for making a water vapor transport membrane, the method comprising:
applying a polymer dispersion to a microporous polymeric flame retardant substrate, the substrate having a porosity of at least 30%, a thickness of less than 75 microns and having an inorganic solids content of less than 3%, the polymer coating comprising a polyethylene-oxide-containing (PEO-containing) polyethylene-polyurethane copolymer and a crosslinker;
allowing the polymer coating to dry and cure for a curing period of at least 24 hours to form an active layer on the substrate, the active layer being air-impermeable and water insoluble and having a thickness of 10 microns or less;
after the curing period contacting the active layer with a liquid polar protic solvent comprising molecules having one or more hydroxyls groups and allowing the active layer to take up and retain molecules of the polar protic solvent such that the molecules of the polar protic solvent are bonded directly to groups in the copolymer;
drying the active layer to provide a membrane that, in a temperature range spanning at least $-5°$ C. to $40°$ C., has a permeability to water vapor of at least 20000 Barrer units and a selectivity ratio for water vapor over carbon dioxide of at least 50.

73. A method according to any of the above example method embodiments, wherein contacting the active layer with the polar protic solvent comprises allowing the active layer to take up the polar protic solvent in an amount of 3% to 100% or 3% to 30% or 3% to 10% of the polymer weight in the active layer.

74. A method according to any of the above example method embodiments, wherein the polar protic solvent comprises one or more of water, methanol, ethanol, and isopropyl alcohol.

75. A method according to example embodiment 74, wherein the polar protic solvent comprises water.

76. A method according to any of the above example method embodiments, wherein the curing period has a duration of at least about 24 or 36 hours.

77. A method according to any of the above example method embodiments, wherein, after drying, the active layer the membrane has a permeability to water vapor of at least 20000 Barrer units.

78. A method according to any of the above example method embodiments, wherein the permeability to water vapor is substantially consistent over a temperature range of about $-25°$ C. to about $60°$ C. or $-10°$ C. to about $40°$ C. in some embodiments.

79. A method according to any of the above example method embodiments, wherein after drying the active layer the membrane comprises a FTIR peak at about 1349 $cm^{-1}$.

80. A method for making a water vapor transport membrane, the method comprising:
applying a PUD to a microporous polymeric substrate and allowing the PUD to dry and cure to form an active layer on the substrate;
the active layer comprising a copolymer having side chains that crystallize below a transition temperature;
shifting the transition temperature by thermally cycling the membrane.

81. A method according to example embodiment 80, further comprising annealing the active layer.

82. A method according to example embodiment 80 or 81, further comprising drying the active layer.

83. A method according to example embodiment 82, wherein after drying the active layer the membrane comprises FTIR peaks at about 1359 $cm^{-1}$ and 1343 $cm^{-1}$ at temperatures below the transition temperature.

84. A method according to example embodiment 82 or 83, wherein after drying the active layer the membrane comprises a FTIR peak at about 1349 $cm^{-1}$ at temperatures above the transition temperature.

85. A method according to any of the above example method embodiments, wherein the substrate is a microporous polyolefin.

86. A method according to example embodiment 85, wherein the polyolefin is uni-axially or bi-axially stretched.

87. A method according to example embodiment 85, wherein the polyolefin is dry-processed.

88. A method according to example embodiment 85, wherein the polyolefin is wet-processed.

89. A method according to any one of example embodiments 85 to 87, wherein the polyolefin comprises PE or PP.
90. A method according to example embodiment 85, wherein the substrate comprises a dry-stretched PP battery separator.
91. A method according to any of the above example method embodiments, wherein the porosity of the substrate is at least about 25% or at least about 30% or at least about 40%.
92. A method according to any of the above example method embodiments, wherein the substrate has a thickness of less than about 150 microns or less than about 50 microns or less than about 35 microns.
93. A method according to any of the above example method embodiments, wherein the substrate has an average pore area of at least 15000 nm$^2$.
94. A method according to any of the above example method embodiments, wherein the substrate is flame retardant.
95. A method according to any of the above example method embodiments, wherein the substrate is hydrophobic.
96. A method according to any of the above example method embodiments, wherein the PUD comprises a polyether-PU copolymer.
97. A method according to any of the above example method embodiments, wherein the PUD comprises TPU.
98. A method according to example embodiment 97, wherein the TPU comprises polyols and one or more of poly-isocyanates and di-isocyanates.
99. A method according to example embodiment 98, wherein the di-isocyanates comprise one or more of aliphatic di-isocyanates and aromatic di-isocyanates.
100. A method according to example embodiment 98, wherein the di-isocyanates comprise one or more of TDI, MDI, HMDI, and IPDI.
101. A method according to any one of example embodiments 98 to 100, wherein the polyols comprise glycols.
102. A method according to example embodiment 100, wherein the glycols comprise one or more of PEG and PPG.
103. A method according to any one of example embodiments 98 to 100, wherein the polyols comprise one or more of polyether diols and polyester diols.
104. A method according to any one of example embodiments 98 to 103, wherein the polyols comprise one or more of short chain diols and long chain polyols.
105. A method according to any of the above example method embodiments, wherein the PUD comprises PERMAX™ 230.
106. A method according to any of the above example method embodiments, wherein the PUD comprises side chains, the side chains comprising one or more of PEO, PCL, and PTMG.
107. A method according to example embodiment 106, wherein the PEO side chains have a molecular weight in the range of about 200 Daltons to about 10000 Daltons.
108. A method according to any of the above example method embodiments, wherein the PUD comprises at least one type of main chain.
109. A method according to example embodiment 108, wherein the at least one type of main chain comprises PEO.
110. A method according to any of the above example method embodiments, wherein the PUD comprises a cross-linker.
111. A method according to example embodiment 110, wherein the cross-linker comprises about 0% to about 16% or about 5% to about 12% of copolymer weight in the PUD.
112. A method according to example embodiment 110 or 111, wherein the cross-linker comprises one or more of isocyanates, carbodiimides, aziridines, and aqueous polycarbodiimide dispersions.
113. A method according to any of the above example method embodiments, wherein the PUD comprises a polymeric solids content in the range of about 20% to about 40% by weight.
114. A method according to any of the above example method embodiments, wherein a coating loading of the active layer on the substrate is in the range of about 0.8 g/m$^2$ to about 1.4 g/m$^2$.
115. A method according to any of the above example method embodiments, wherein after drying the active layer the thickness of the active layer is about 0.5 microns to about 10 microns.
116. A method according to any of the above example method embodiments, wherein after drying the active layer the active layer forms a substantially continuous and dense film on a first surface of the substrate.
117. A method according to any of the above example method embodiments, wherein after drying the active layer the active layer forms a substantially continuous and dense film on a second surface of the substrate.
118. A method according to any of the above example method embodiments, wherein after drying the active layer the membrane is selective for water vapor transport.
119. A method according to any of the above example method embodiments, wherein after drying the active layer the membrane is more permeable to water vapor than it is to VOCs.
120. A method according to any of the above example method embodiments, wherein the surface of the substrate is substantially free of materials that inhibit crystallization of the side chains and/or the main chains of the active layer.
121. A method according to any of the above example method embodiments, wherein the surface of the substrate is substantially free of SiO$_2$ and TiO$_2$.
122. A method according to any of the above example method embodiments, wherein the substrate is substantially free of materials that inhibit crystallization of the side chains and/or the main chains of the copolymer.
123. A method according to any of the above example method embodiments wherein the substrate is substantially free of SiO$_2$ and TiO$_2$.
124. A method according to any of the above example method embodiments, wherein the substrate is prepared to receive the active layer before applying the polyurethane dispersion (PUD) to the substrate.
125. A method according to any of the above example method embodiments, comprising preparing the substrate to receive the active layer before applying the PUD to the substrate.
126. A method according to example embodiment 121, wherein preparing the substrate comprises subjecting the substrate to a corona treatment.
127. Apparatus having any new and inventive feature, combination of features, or sub-combination of features as described herein.
128. Methods having any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

We claim:

1. A method for making a water vapor transport membrane, the method comprising:
   applying a polymer coating to a microporous polymeric substrate, the polymer coating comprising a polyethylene-oxide-containing (PEO-containing) copolymer;
   allowing the polymer coating to dry and cure for a curing period to form an active layer on the substrate;
   after the curing period contacting the active layer with a polar protic solvent; and
   drying the active layer.

2. A method according to claim 1, wherein the polar protic solvent is water.

3. A method according to claim 1, wherein contacting the active layer with the polar protic solvent comprises allowing the active layer to take up the polar protic solvent in an amount of 3% to 100% of the weight of the active layer.

4. A method according to claim 1, wherein the polymer coating comprises a thermoplastic polyurethane (TPU) formed by the reaction of at least one polyol with one or more of one or more poly-isocyanates and one or more di-isocyanates.

5. A method according to claim 1, wherein, after drying, the active layer of the membrane has a permeability to water vapor of at least 20000 Barrer units over a temperature range of about −5° C. to about 40° C.

6. A method according to claim 1, wherein, after drying, the active layer has a FTIR peak at about 1349 $cm^{-1}$.

7. A method according to claim 1, wherein, after drying, the selectivity ratio of the membrane for water vapor over carbon dioxide is at least 50.

8. A method according to claim 1, wherein:
   the polymer coating comprises a PEO-containing polyethylene-polyurethane copolymer and a crosslinker;
   the substrate comprises a microporous polymeric substrate, the substrate having a porosity of at least 30% by volume, a thickness of less than 75 microns and an inorganic solids content of less than 3% by weight; and
   the curing period is at least 24 hours;
   the active layer after curing is air-impermeable and water insoluble and has a thickness of 10 microns or less;
   the polar protic solvent comprises molecules having one or more hydroxyl groups;
   after drying the active layer, in a temperature range spanning at least −5° C. to 40° C., the active layer has a permeability to water vapor of at least 20000 Barrer units, and
   the membrane provided by the method has a selectivity ratio for water vapor over carbon dioxide of at least 50.

9. A method according to claim 1, wherein contacting the active layer with the polar protic solvent and drying the active layer modifies the water vapour transport characteristics of the active layer.

10. A method according to claim 9 wherein, prior to contacting the active layer with the polar protic solvent, the active layer exhibits a step change in water vapour permeability with increasing temperature; and, after contacting the active layer with the polar protic solvent and drying, the step change in water vapour permeability with increasing temperature is substantially eliminated.

11. A water vapor transport membrane comprising a microporous polymeric substrate and an air-impermeable active layer coated on a surface of the substrate, wherein the active layer comprises a polyethylene-oxide-containing (PEO-containing) copolymer and a polar protic solvent in an amount of about 3% to about 100% of weight of the active layer, wherein:
   the microporous polymeric substrate has a porosity of at least 30% by volume, a thickness of less than 75 microns and an inorganic solids content of less than 3% by weight; and
   the polyethylene-oxide-containing (PEO-containing) copolymer comprises a cross-linked polyethylene-oxide-containing (PEO-containing) polyethylene-polyurethane copolymer, and the polar protic solvent has one or more hydroxyl groups,
   the active layer is air-impermeable and water insoluble and has a thickness of 10 microns or less; and
   the membrane is characterized by the active layer having a permeability to water vapor of at least 2000 Barrer units over a temperature range spanning at least −5° C. to 40° C. and the membrane having a selectivity ratio for water vapor over carbon dioxide of at least 50.

12. A water vapor transport membrane according to claim 11, wherein the polar protic solvent is water.

13. A water vapor transport membrane according to claim 11, wherein the substrate comprises a microporous polyolefin.

14. A water vapor transport membrane according to claim 13, wherein the polyolefin comprises polyethylene (PE) or polypropylene (PP), and the substrate has a thickness of less than about 50 microns.

15. A water vapor transport membrane according to claim 11, wherein the material of the active layer has a Fourier transform infrared spectroscopy (FTIR) peak at about 1349 $cm^{-1}$.

* * * * *